(12) United States Patent
Cole

(10) Patent No.: US 7,197,054 B2
(45) Date of Patent: Mar. 27, 2007

(54) METHODS AND APPARATUS FOR CONVERSION OF ONE OR MORE DATA STREAMS

(75) Inventor: Steven R. Cole, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 1072 days.

(21) Appl. No.: 10/161,765

(22) Filed: Jun. 4, 2002

(65) Prior Publication Data

US 2003/0225901 A1 Dec. 4, 2003

(51) Int. Cl.
*H04J 3/22* (2006.01)
*H04J 3/16* (2006.01)

(52) U.S. Cl. ........................ 370/543; 370/468
(58) Field of Classification Search ................ 370/468, 370/235, 542, 543, 544
See application file for complete search history.

(56) References Cited

U.S. PATENT DOCUMENTS

| | | | |
|---|---|---|---|
| 3,749,839 A | 7/1973 | Fornasiero et al. | |
| 4,012,589 A | 3/1977 | Reisinger | |
| 4,157,458 A | 6/1979 | Roche | |
| 4,584,616 A * | 4/1986 | Allen | 360/48 |
| 4,975,911 A * | 12/1990 | Tarleton | 370/503 |
| 5,243,600 A | 9/1993 | Mori et al. | |
| 5,420,894 A * | 5/1995 | Boslough et al. | 375/372 |
| 5,946,327 A | 8/1999 | Murphy | |
| 6,018,305 A * | 1/2000 | Kikuchi et al. | 341/100 |
| 6,058,427 A * | 5/2000 | Viswanath et al. | 709/231 |
| 7,027,735 B2 * | 4/2006 | Kumar | 398/102 |
| 2003/0219032 A1 * | 11/2003 | Tweed et al. | 370/468 |

OTHER PUBLICATIONS

Actel, "40MX and 42MX FPGA Families", Feb. 2001, 33pgs. ©2001 Actel Corporation.
"FPGA Basics", by Andraka Consulting Group download from http://www.andraka.com/whatisan.htm on Mar. 25, 2002. 2pgs. ©1998-2000.

* cited by examiner

*Primary Examiner*—Huy D. Vu
*Assistant Examiner*—Blanche Wong

(57) ABSTRACT

A system, method, apparatus, means, and computer program code that facilitate conversion of a single data stream into two or more data streams (e.g., a down rate conversion) and for systems, means and that facilitate conversion of two or more input data streams into a single output data stream (e.g., an up rate conversion). According to some embodiments of the present invention, for an up rate conversion of two or more input data streams into a single output data stream, bits from the input data stream are shifted through a set of shift register elements or other storage positions on each clock cycle, but bits are only loaded into shift register elements on every other clock cycle. In contrast, according to some embodiments of the present invention, for a down rate conversion of a single input data stream into two or more separate output data streams, bits from the input data stream are loaded into pairs of shift register elements or other storage positions on each clock cycle, but are shifted through the shift register elements only on every other clock cycle.

24 Claims, 7 Drawing Sheets

| 100 | TS 0 | | TS 1 | | TS 2 | |
|---|---|---|---|---|---|---|
| CLOCK COUNT | 7-8-9-A-B-C-D-E-F-0-1-2-3-4-5-6-7-8-9-A-B-C-D-E-F-0-1-2- | | | | | |
| HWY2A BIT POSIT. | 0 - - - 1 - - - 2 - - - 3 - - - 4 - - - 5 - - - 6 - - - 7 - - - 0 - - - 1 - - - 2 - - - 3 - - - 4 - - - 5 - | | | | | |
| HWY2B BIT POSIT. | | | 8 - - - 9 - - - A - - - B - - - C - - - D - - - E - - - F - - - 8 - - - 9 - | | | |
| SR7 | 0 - - - - - - - - - - - - - 8 - - - - - - - - - - - - - 0 - - - - - - - - - - - - - - 8 - - - | | | | | |
| SR6 | 0 - 1 - - - - - - - - - - - 8 - 9 - - - - - - - - - - - 0 - 1 - - - - - - - - - - - - - 8 - | | | | | |
| SR5 | 0 - 1 - 2 - - - - - - - - - 8 - 9 - A - - - - - - - - - 0 - 1 - 2 - - - - - - - - - - - | | | | | |
| SR4 | 0 - 1 - 2 - 3 - - - - - - - 8 - 9 - A - B - - - - - - - 0 - 1 - 2 - 3 - - - - - - - | | | | | |
| SR3 | 0 - 1 - 2 - 3 - 4 - - - - - 8 - 9 - A - B - C - - - - - 0 - 1 - 2 - 3 - 4 - - - | | | | | |
| SR2 | 0 - 1 - 2 - 3 - 4 - 5 - - - 8 - 9 - A - B - C - D - - - 0 - 1 - 2 - 3 - 4 - | | | | | |
| SR1 | 0 - 1 - 2 - 3 - 4 - 5 - 6 - - 8 - 9 - A - B - C - D - E - - - 0 - 1 - 2 - 3 - | | | | | |
| SR0 | 0 - 1 - 2 - 3 - 4 - 5 - 6 - 7 - 8 - 9 - A - B - C - D - E - F - 0 - 1 - 2 - | | | | | |

| 100 | TS 0 | TS 1 | TS 2 |
|---|---|---|---|
| CLOCK COUNT | 7-8-9-A-B-C-D-E-F-0-1-2-3-4-5- | 6-7-8-9-A-B-C-D-E-F-0-1-2- | |
| HWY2A BIT POSIT. | 0---1---2---3---4---5---6--- | 7---0---1---2---3---4---5- | |
| HWY2B BIT POSIT. | 8---9---A---B---C---D---E--- | F---8---9- | |
| SR7 | 0--------------8------------- | -------0----------------8--- | |
| SR6 | 0-1-------------8-9---------- | --------0-1---------------8- | |
| SR5 | 0-1-2------------8-9-A------- | ---------0-1-2-------------- | |
| SR4 | 0-1-2-3-----------8-9-A-B---- | ----------0-1-2-3----------- | |
| SR3 | 0-1-2-3-4-----------8-9-A-B-C- | ---------0-1-2-3-4---- | |
| SR2 | 0-1-2-3-4-5----------8-9-A-B-C-D- | --------0-1-2-3-4- | |
| SR1 | 0-1-2-3-4-5-6---8-9-A-B-C-D-E- | ---0-1-2-3- | |
| SR0 | 0-1-2-3-4-5-6-7-8-9-A-B-C-D-E-F-0-1-2- | | |

FIG. 1

| 200 | TS 0 | TS 1 | TS 2 |
|---|---|---|---|
| CLOCK COUNT | 7-8-9-A-B-C-D-E-F-0-1-2-3-4-5- | 6-7-8-9-A-B-C-D-E-F-0-2-3- | |
| HWY2A BIT POSIT. | 0---1---2---3---4---5---6--- | 7---0---1---2---3---4---5- | |
| HWY2A BITS | 0---0---0---1---1---0---1--- | 1---1---1---0---1---0---1- | |
| HWY2B BIT POSIT. | 8---9---A---B---C---D---E--- | F---8---9- | |
| HWY2B BITS | 0---1---1---0---1---1---0--- | 0---1---0- | |
| SR7 | 0---------------0------------- | ----1----------------1--- | |
| SR6 | 0-0--------------0-1---------- | -----1-1-----------------1- | |
| SR5 | 0-0-0-------------0-1-1------- | ------1-0---------------1-1-0-------- | |
| SR4 | 0-0-0-1------------0-1-1-0---- | -------1-1-0-1-------- | |
| SR3 | 0-0-0-1-1-----------0-1-1-0-1- | ------1-1-1-0-1-0--- | |
| SR2 | 0-0-0-1-1-0----------0-1-1-0-1-1- | -----1-1-1-0-1-0- | |
| SR1 | 0-0-0-1-1-0-1---0-1-1-0-1-1-0- | ---1-1-0-1- | |
| SR0 | 0-0-0-1-1-0-1-1-0-1-1-0-1-1-0-0-1-1-0- | | |

FIG. 2

| 300 | TS 0 | TS 1 | TS 2 | TS 3 | TS 4 | TS 5 |
|---|---|---|---|---|---|---|
| CLOCK COUNT | 0123456789ABCDEF | JKLMNPQRSTUVWXYZ | | 0123456789ABCDEF | JKLMNPQRSTUVWX | |
| HWY1A BIT POSIT. | 0---1---2---3---4---5---6---7---0---1---2---3---4---5---6---7- | | | | | |
| HWY1B BIT POSIT. | 8---9---A---B---C---D---E---F---8---9---A---B---C---D- | | | | | |
| HWY1C BIT POSIT. | J---K---L---M---N--P---Q---R---J---K---L---M- | | | | | |
| HWY1D BIT POSIT. | S---T---U---V---W---X---Y---Z---S---T- | | | | | |
| SR22 | 0--------8--------J--------S--------0--------8--------J--------S--- | | | | | |
| SR21 | 0--------8--------J--------S--------0--------8--------J--------S-- | | | | | |
| SR20 | 0--------8--------J--------S--------0--------8--------J--------S- | | | | | |
| SR19 | 01------89------JK------ST------01------89------JK------S | | | | | |
| SR18 | 01------89------JK------ST------01------89------JK------ | | | | | |
| SR17 | 01------89------JK------ST------01------89------JK----- | | | | | |
| SR16 | 012-----89A-----JKL-----STU-----012-----89A-----JKL--- | | | | | |
| SR15 | 012-----89A-----JKL-----STU-----012-----89A-----JKL-- | | | | | |
| SR14 | 012-----89A-----JKL-----STU-----012-----89A-----JKL- | | | | | |
| SR13 | 0123----89AB----JKLM----STUV----0123----89AB----JKL | | | | | |
| SR12 | 0123----89AB----JKLM----STUV----0123----89AB----JK | | | | | |
| SR11 | 0123----89AB----JKLM----STUV----0123----89AB----J | | | | | |
| SR10 | 01234---89ABC---JKLMN---STUVW---01234---89ABC--- | | | | | |
| SR9 | 01234---89ABC---JKLMN---STUVW---01234---89ABC-- | | | | | |
| SR8 | 01234---89ABC---JKLMN---STUVW---01234----89ABC | | | | | |
| SR7 | 012345--89ABCD--JKLMNP--STUVWX--012345---89AB | | | | | |
| SR6 | 012345--89ABCD--JKLMNP--STUVWX--012345---89A | | | | | |
| BR5 | 012345--89ABCD--JKLMNP--STUVWX--012345---89 | | | | | |
| SR4 | 0123456-89ABCDE-JKLMNPQ-STUVWXY-0123456--8 | | | | | |
| SR3 | 0123456-89ABCDE-JKLMNPQ-STUVWXY-0123456-- | | | | | |
| SR2 | 0123456-89ABCDE-JKLMNPQ-STUVWXY-0123456- | | | | | |
| SR1 | 0123456789ABCDEFJKLMNPQRSTUVWXYZ0123456 | | | | | |
| SR0 | 0123456789ABCDEFJKLMNPQRSTUVWXYZ012345 | | | | | |

FIG. 3

| 400 | TS 0 | TS 1 | TS 2 | TS 3 |
|---|---|---|---|---|
| CLOCK COUNT | 4-5-6-7-8-9-A-B- | C-D-E-F-0-1-2-3- | 4-5-6-7-8-9-A-B- | C-D-E-F-0-1-2- |
| HWY4 BIT POSIT. | 0-1-2-3-4-5-6-7- | 8-9-A-B-C-D-E-F- | 0-1-2-3-4-5-6-7- | 8-9-A-B-C-D-E- |
| SRA7 | | 6-7------------- | ---------------- | 6-7------------ |
| SRA6 | | 4-5---6---7----- | ---------------- | 4-5---6---7---- |
| SRA5 | 2-3---4---5---6---7----- | ---------------- | 2-3---4---5---6---7---- |
| SRA4 | 0-1---2---3---4---5---6---7---- | -0-1---2---3---4---5---6---7- |
| SRA3 | 0---1---2---3---4---5---6---7---0---1---2---3---4---5---6- |
| SRA2 | 0---1---2---3---4---5---6---7---0---1---2---3---4---5- |
| SRA1 | 0---1---2---3---4---5---6---7---0---1---2---3---4- |
| SRA0 | 0---1---2---3---4---5---6---7---0---1---2---3- |
| | | | | |
| SRB7 | | E-F------------- | ---------------- | --------------- |
| SRB6 | | C-D---E---F----- | ---------------- | ------------C-D- |
| SRB5 | | A-B---C---D---E---F----- | ---------A-B---C- |
| SRB4 | | 8-9---A---B---C---D---E---F-----8-9---A---B- |
| SRB3 | | 8---9---A---B---C---D---E---F---8---9---A- |
| SRB2 | | 8---9---A---B---C---D---E---F---8---9- |
| SRB1 | | 8---9---A---B---C---D---E---F---8- |
| SRB0 | | 8---9---A---B---C---D---E---F- |

FIG. 5

| 500 | TS 0 | TS 1 | TS 2 | TS 3 |
|---|---|---|---|---|
| CLOCK COUNT | 4-5-6-7-8-9-A-B- | C-D-E-F-0-1-2-3-4- | 5-6-7-8-9-A-B-C-D- | E-F-0-1-2- |
| HWY4 BIT POSIT. | 0-1-2-3-4-5-6-7- | 8-9-A-B-C-D-E-F-0- | 1-2-3-4-5-6-7-8-9- | A-B-C-D-E- |
| HWY4 BITS | 0-0-0-1-1-0-1-1- | 0-1-1-0-1-1-0-0-1- | 1-0-1-0-1-0-1-1-0- | 1-0-1-0-0- |
| SRA7 |  | 1-1-------------- | ---------0-1------ | ---------- |
| SRA6 | 1-0- | --1---1---------- | ----0-1---0---1--- | ---------- |
| SRA5 | 0-1---1---0- | --1---1---------- | ----0-1---0---1--- | 0---1----- |
| SRA4 | 0-0---0---1---1- | --0---1---1------ | 1-1---0---1---0--- | 1---0---1- |
| SRA3 | 0---0---0---1---1- | --0---1---1------ | 1---1---0---1---0- | --1---0- |
| SRA2 | 0---0---0---1---1- | --0---1---------- | 1---1---1---0---1- | --0---1- |
| SRA1 | 0---0---0---1---1- | --0---1---1---1-- | -1---1---1---0---1- | ---0- |
| SRA0 | 0---0---0---1-- | -1---0---1---1--- | 1---1---1---0---1- |  |
| SRB7 |  | 0-0- |  |  |
| SRB6 |  | 1-1---0---0------ | ------------------ | ---1-0- |
| SRB5 |  | 1-0---1---1---0-- | -0---------------- | 1-0---1- |
| SRB4 |  | 0-1---1---0---1-- | -1---0---0------- | 1-0---1---0- |
| SRB3 |  | 0---1---1---0---1- | --1---0---0---1--- | -0---1- |
| SRB2 |  | 0---1---1---0---1- | --1---0---0---1--- | -0- |
| SRB1 |  | 0---1---1---0---1- | --1---0---0------- | ---1- |
| SRB0 |  | 0---1---1---0---1- | --1---1---0------- | ---0- |

FIG. 6

| 600 | TS 0 | TS 1 | TS 2 | TS 3 |
|---|---|---|---|---|
| CLOCK COUNT | 4-5-6-7-8-9-A-B | 0-1-2-3-4-5 | 6-7-8-9-A-B | 0-1-2-3-4 |
| HWY4 BIT POSIT. | 0-1-2-3-4-5-6-7-8-9-A-B | 0-1-2-3-4-5 | 6-7-8-9-A-B | 0 |
| SRA3 | 4-5 | | 4-5 | |
| SRA2 | 2-3---4---5 | | 2-3---4---5 | |
| SRA1 | 0-1---2---3---4---5 | 0-1---2---3---4---5 | | |
| SRA0 | 0---1---2---3---4---5 | 0---1---2---3---4---5 | | |
| SRB3 | | A-B | | A-B |
| SRB2 | | 8-9---A-B | | 8-9---A |
| SRB1 | | 6-7---8---9---A---B | 6-7---8---9 | |
| SRB0 | | 6---7---8---9---A---B | 6---7---8 | |

FIG. 7

METHODS AND APPARATUS FOR CONVERSION OF ONE OR MORE DATA STREAMS

FIELD OF THE INVENTION

The present invention relates to a method and apparatus for converting one or more data streams and, more particularly, embodiments of the present invention relate to methods, means, apparatus, and computer program code for converting a single data stream into two or more data streams and for converting two or more data streams into a single data stream.

BACKGROUND OF THE INVENTION

Many communication or data processing systems use or need rate conversion of data streams. For example, in a time division multiplexed (TDM) system, a 4 Mbps data stream may be converted into two 2 Mbps data steams. Alternatively, two 2 Mbps data streams may be combined to a form a single 4 Mbps data stream.

Rate conversion of data streams is available in some TDM memory-time-switch devices. However, such devices can be relatively expensive and often provide other functions than merely rate conversion. Thus, use of such devices to provide only rate conversion can be cost inefficient.

It would be advantageous to provide a method and apparatus that overcame the drawbacks of the prior art. In particular, it would be desirable to provide a method and apparatus for rate conversion of a single data stream into two separate data streams. In addition, it would be desirable to provide a method and apparatus for rate conversion of two separate data streams into a single data stream.

SUMMARY OF THE INVENTION

Embodiments of the present invention provide a system, method, apparatus, means, and computer program code that facilitate conversion of a single data steam into two or more data streams (e.g., a down rate conversion) and for systems, methods, apparatus, means and computer program code that facilitate conversion of two or more data streams into a single data stream (e.g., an up rate conversion). For example, a time division multiplexed system might convert a 4 Mbps data stream into two 2 Mbps data streams. Alternatively, or in addition, a time division multiplexed system might convert two 4 Mbps data streams into a single 8 Mbps data stream.

According to some embodiments of the present invention, for an up rate conversion of two or more data streams into a single data stream, bits from the data stream are shifted or otherwise moved through a set of shift registers, shift register positions, shift register stages, or shift register elements on each clock cycle, but bits are only loaded (also referred to as filled) into shift registers, shifter register positions, etc. on every other clock cycle. In contrast, according to some embodiments of the present invention, for a down rate conversion of a single data steam into two or more separate data streams, bits from the single data stream are loaded into pairs of shift registers, shift register positions, shift register stages or shift register elements (otherwise referred to herein as storage positions) on each clock cycle, but are shifted through the shift registers, shift register positions, or shift register elements only on every other clock cycle. In some embodiments, a storage position may be, include, or otherwise be created by a shift register element.

Additional objects, advantages, and novel features of the invention shall be sex forth in part in the description that follows, and in part will become apparent to those skilled in the art upon examination of the following or may be learned by the practice of the invention.

According to some embodiments of the present invention, a method for use in converting multiple data streams into a single data stream may include on a first clock count, loading a first bit from a first data stream into a first storage position; on a second clock count, shifting the first bit from the first data stream into a second storage position; on a third clock count, shifting the first bit from the first data stream into a third storage position and loading a second bit from the first data stream into the second storage position; and on a fourth clock count, shifting the first bit from the first data stream into a fourth storage position and shifting the second bit from the first data stream into the third storage position. In other embodiments, a method for use in taking sets of N bits from D input data streams to form a single data stream may include loading a first bit from a first of the D input data streams into a first storage position on a first clock count; shifting the first bit from the first of the D input data streams through at least $[((D-1) \times N)-D/2+1]$ storage positions during a set of $[((D-1) \times N)-D/2+1]$ clock counts starting after the first clock count; and conducting D simultaneous load operations wherein during each of the load operations a bit from each of the D input data streams is loaded into a different storage position. In further embodiments, a method for use in taking sets of N bits from D input data streams to form a single data stream may include loading a first bit from a first of the D input data streams into a first storage position on a first clock count; and shifting the first bit from the first of the D input data streams through at least $[(D-1) \times (N-1)]$ storage positions during a set of $[(D-1) \times (N-1)]$ clock counts starting after the first clock count. In yet other embodiments, a method for use in converting D sets of N bits from an input data stream into D output data streams may include starting at a first clock count, loading a bit from a first set of N different bit positions of the input data stream into a first set of N/2 storage positions during a first set of N clock counts, wherein two bits from the input data stream are loaded into each of the first set of N/2 storage positions; and starting at an N+1 clock count, loading a bit from a second set of N different bit positions of the input, data stream into a second set of N/2 storage positions during a second set of N clock counts, wherein two bits from the input data stream are loaded into each of the second set of N/2 storage positions. In still further embodiments, a method for use in converting a data stream into multiple data streams may include on a first clock count, loading a first bit from a data stream into a first storage position; on a second clock count, shifting the first bit into a second storage position and loading a second bit from the data stream into the first storage position; and on a third clock count, loading a third bit from the data stream into a third storage position.

According to some embodiments of the present invention, an apparatus for conversion of one or more data streams or for performing the one or more of the methods above may include a clock, load register, and one or more shift registers. For example, in some embodiments, an apparatus for use in converting sets of N bits from D input data streams into a single output data stream may include a clock; a load register connected to the clock; and a shift register connected to the clock and to the load register, wherein the shift register includes a plurality of shift register elements; wherein the clock, the load register and the shift register are operative to: load a first bit from a first of the D input data streams into a first of the plurality of shift register elements on a first clock count; shift the first bit from the first of the D input data streams through at least [(D−1)×(N−1)] of the plurality of shift register elements during a set of [(D−1)×(N−1)] clock counts starting after the first clock count; and conduct D simultaneous load operations wherein during each of the load operations a bit from each of the D input data streams is loaded into a different one of the plurality of shift register elements. As another example, in some embodiments, an apparatus for use in converting D sets of N bits from an input data stream into D output data streams may include a clock; a load register connected to the clock; and a D number of shift registers connected to the clock and, to the load register, wherein each of the D member of shift registers includes a plurality of shift register elements; wherein the clock, the load register and the D number of shift registers are operative to: starting at a first clock count, load a bit from a first set of N different bit positions of the input data stream into a first set of N/2 shift register elements during a first set of N clock counts, wherein two bits from the input data stream are loaded into each of the first set of N/2 shift register elements; and starting at an N+1 clock count, load a bit from a second set of N different bit positions of the input data stream into a second set of N/2 shift register elements during a second set of N clock counts, wherein two bits from the input data stream are loaded into each of the second set of N/2 shift register elements.

According to some embodiments of the present invention, an apparatus for use in converting multiple data streams into a single data stream may include means for using, on a first clock count, a first bit from a first data stream to fill a first storage position; means for moving, on a second clock count, the first bit from the first data stream into a second storage position; means, on a third clock count, for moving the first bit from the first data stream into a third storage position and for using a second bit from the first data stream to fill the second storage position; and means, on a fourth clock count, for moving the first bit from the first data stream into a fourth storage position and for moving the second bit from the first data stream into the third storage position. In other embodiments, an apparatus for use in taking sets of N bits from D input data streams to form a single data stream may include means for using a first bit from a first of the D input data streams to fill a first storage position on a first clock count; means for moving the first bit from the first of the D input data streams through at least [((D−1)×N)−D/2+1] storage positions during a set of [((D−1)×N)−D/2+1] clock counts starting after the first clock count; and means for implementing D simultaneous load operations wherein during each of the load operations a bit from each of the D input data streams is loaded into a different storage position, In further embodiments, an apparatus for use in taking sets of N bits from D input data streams to form a single data stream may include means for using a first bit from a first of the D input data streams to fill a first storage position on a first clock count; and means for moving the first bit from the first of the D input data streams through at least [(D−1)× (N−1)] storage positions during a set of [(D−1)×(N−1)] clock counts starting after the first clock count. In yet other embodiments, an apparatus for use in converting D consecutive sets of N bits from an input data stream into D output data streams may include means for, starting at a first clock count, using a bit from a first set of N different bit positions of the input data stream to fill a first set of N/2 storage positions during a first set of N clock counts, wherein two bits from the input data stream are used to fill each of the first set of N/2 storage positions; and means for, starting at an N+1 clock count, using a bit from a second set of N different bit positions of the input data stream to fill a second set of N/2 storage positions during a second set of N clock counts, wherein two bits from the input data stream are used to fill each of the second set of N/2 storage positions. In still further embodiments, an apparatus for use in converting a data stream into multiple data streams may include means for, on a first clock count, using a first bit from a data stream to fill a first storage position; means for, on a second clock count, moving the first bit into a second storage position and for using a second bit from the data stream to fill the first storage position; and means for, on a third clock count, using a third bit from the data stream to fill a third storage position.

According to some embodiments of the present invention, a computer program product in a computer readable medium for use in converting multiple data streams into a single data stream may include first instructions for using, on a first clock count, a first bit from a first data stream to fill a first storage position; second instructions for moving, on a second clock count, the first bit from the first data stream into a second storage position; third instructions, on a third clock count, for moving the first bit from the first data stream into a third storage position and for using a second bit from the first data stream to fill the second storage position; and fourth instructions, on a fourth clock count, for moving the first bit from the first data stream into a fourth storage position and for moving the second bit from the first data stream into the third storage position. In other embodiments, a computer program product in a computer readable medium for use in taking sets of N bits from D input data streams to form a single data stream may include first instructions for using a first bit from a first of the D input data streams to fill a first storage position on a first clock count; second instructions for moving the first bit from the first of the D input data streams through at least [((D−1)×N)−D/2+1] storage positions during a set of [((D−1)×N)−D/2+1] clock counts starting after the first clock count; and third instructions for implementing D simultaneous load operations wherein during each of the load operations a bit from each of the D input data streams is loaded into a different storage position. In further embodiments, computer program product in a computer readable medium for use in taking sets of N bits from D input data streams to form a single data stream may include first instructions for using a first bit from a first of the D input data streams to fill a first storage position on a first clock count; and second instructions for moving the first bit from the first of the D input data streams through at least [(D−1)×(N−1)] storage positions during a set of [(D−1)× (N−1)] clock counts starting after the first clock count. In yet other embodiments, a computer program product in a computer readable medium use in converting D consecutive sets of N bits from an input data stream into D output data streams may include first instructions for, starting at a first clock count, using a bit from a first set of N different bit positions of the input data stream to fill a first set of N/2 storage positions during a first set of N clock counts, wherein two bits from the input data stream are loaded into each of the first set of N/2 storage positions; and second instructions for, starting at an N+1 clock count, using a bit from a second set of N different bit positions of the input data stream and filling a second set of N/2 storage positions during a second set of N clock counts, wherein two bits from the input data stream are loaded into each of the second set of N/2 storage positions. In still further embodiments, a computer program product in a computer readable medium for use in converting a data stream into multiple data streams may include first instructions for, on a first clock count, using a first bit from a data stream to fill a first storage position; second instructions for, on a second clock count, moving the first bit into a second storage position and for using a second bit from the data stream to fill the first storage position; and third instructions for, on a third clock count, using a third bit from the data stream to fill a third storage position.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

FIG. 1 is an illustration of a conversion of two input data streams into a single data stream in accordance with the present invention;

FIG. 2 is another illustration of a conversion of two data input streams into a single data stream in accordance with the present invention;

FIG. 3 is an illustration of a conversion of four input data streams into a single data stream in accordance with the present invention;

FIG. 5 is an illustration of a conversion of a single data stream into two data streams in accordance with the present invention;

FIG. 6 is another illustration of a conversion of a single data stream into two data streams in accordance with the present invention;

FIG. 7 is another illustration of a conversion of a single data stream into two separate data streams in accordance with the present invention.

DETAILED DESCRIPTION

Figure 4:
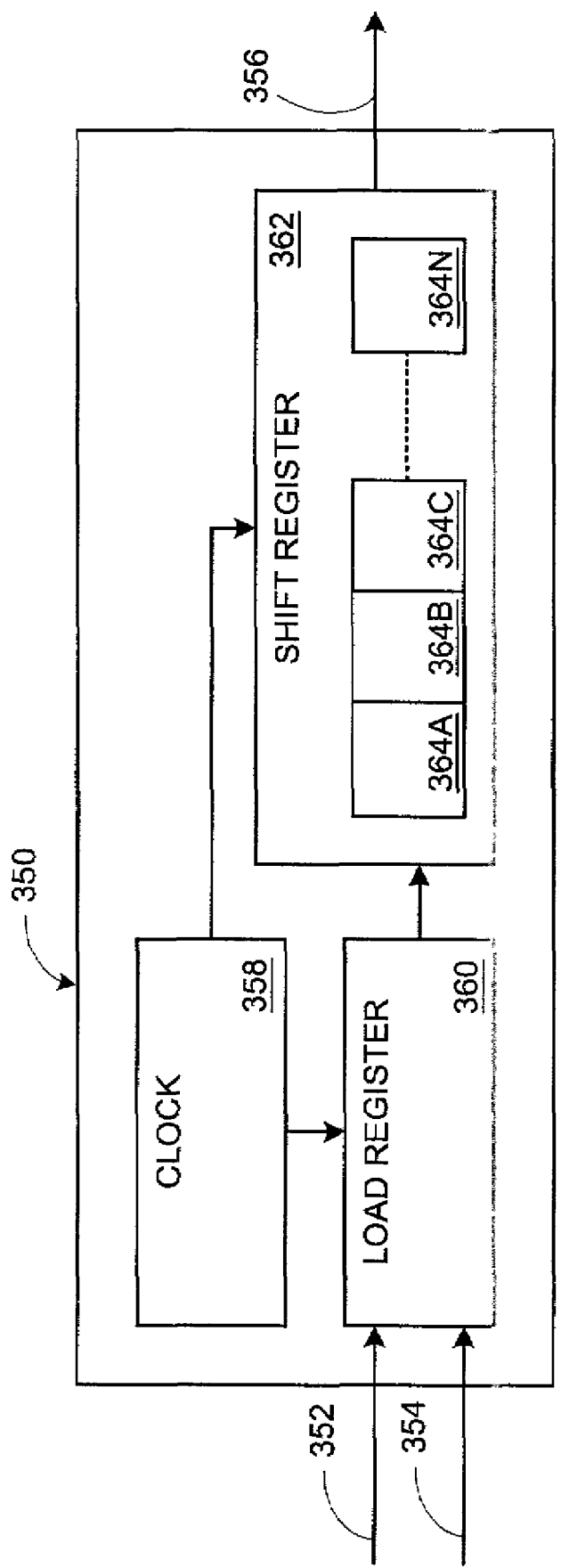
FIG. 4 is an illustration of a representative device that may be used to implement conversions of two or more input data streams into a single output data stream.

Applicants have recognized that there is a need for systems, means, computer program code and methods that facilitate conversion of a single data stream into two or more data streams (e.g., a down rate conversion) and for systems, means and that facilitate conversion of two or more data streams into a single data stream (e.g., an up rate conversion). For example, a time division multiplexed system might convert an 8 Mbps data stream into two 4 Mbps data streams. Alternatively, or in addition, a time division multiplexed system might convert two 2 Mbps data streams into a single 4 Mbps data stream. As will be discussed in more detail below, according to some embodiments of the present invention, for an up rate conversion of two data streams into a single data stream, bits from the data stream are shifted through a set of storage positions (e.g., shift registers or shift register elements) on each clock cycle, but bits are only loaded into storage positions (e.g., shift registers or shift register elements) on every other clock cycle. In contrast, also as will be discussed in more detail below, according to some embodiments of the present invention, or a down rate conversion of a single data stream into two separate data streams, bits from the single data stream are loaded into pairs of storage positions (e.g., shift register elements) on each clock cycle, but are shifted through the storage positions (e.g., shift register elements) only on every other clock cycle.

In some embodiments, the shifting of bits into and out of shift register elements or shift registers (or other types of storage positions) may occur on rising or leading clock signal edges. Similarly, the loading of bits into shift register elements or shift registers (or other types of storage positions) also may occur on rising or leading clock signal edges. In some embodiments, shift register elements or other storage may be consecutive or otherwise be configured such that the output of one shift register element or storage position is an input into another shift register element or storage position.

For both the up rate and down rate conversions, additional shift registers or shift register elements may be used to align, offset, synchronize or adjust one or more of the input and/or output data streams, adjust the sampling point during a bit period, etc. For the down rate conversion, each bit on one of the output data streams may last twice as long as each bit on the input stream. For the up rate conversion, each bit on the output data stream may be half as long as each bit on the input data streams.

For purposes of discussion of the present invention, shift registers (each of which may include one or more shift register elements) will be used to convert data streams. However, any other sort of temporary or permanent memory, latching or other storage device may be used instead of shift registers. The term "storage position" will be used herein to refer broadly to and include, but not be limited to, any such shift register, shift register stage or element, shift register position, memory or memory location, latching device or element, logic array, programmable device or other device or element that may be used to store on or more bits of data and/or otherwise implement the methods described herein. No specific limitation(s) is implied or intended by the use of the term "storage position". Thus, in some embodiments, a storage position may include, be or be created by a shift register element or be a shift register position (which may be implemented in software via a programmable array or other device). These and other features will be discussed in further detail below, by describing a system, individual devices, and processes according to embodiments of the invention.

Up Rate Conversion

In an up rate conversion in accordance with the present invention, a number D of two or more input data streams having N bits or bit positions per time slot are converted into a single output data stream having alternating sets of N bits from the D input data streams. For such an up rate conversion, $[(N-1) \times (D-1)+1]$ shift register elements (also referred to herein as shift register stages) or other storage elements (also referred to herein as storage positions or stages) can be used in accordance with the present invention.

Now referring to table 100 in FIG. 1, a process of converting of two data streams into a single data stream will now be discussed. The data streams, referred to herein as Highway 2A (HWY2A in the table 100 in FIG. 1) and Highway 2B (HWY2B in the table 100 in FIG. 1), will be combined to form a single data stream. Each of the data streams Highway 2A and Highway 2B contains strings of bits for corresponding time slots (TS), each bit being in a bit position for one of the highways and comprising either a "zero" or a "1". Each bit position in each of the data streams is represented in the table 100 by a position indicator that repeats for each even time slot or for each odd time slot. For example, Highway 2A consists of eight bit positions "0", "1", "2", "3", "4", "5", "6" and "7" for each even time slot. Highway 2A includes even numbered time slots indicated as "TS 0" and "TS 2" in the table 100, each of which has eight associated bit positions that are referred to as "0", "1", "2", "3", "4", "5", "6" and "7". Highway 2B includes odd number time slots indicated "TS 1" and "TS 2" in the table 100, each of which has eight associated bit positions that are referred to as "8", "9" "A", "B", "C", "D", "E" and "F" in the table 100. In other embodiments, time slots of other bit sizes may be used in conjunction with the shift and load techniques described herein.

The use of terms "time slot", "Highway" and "bit position" and their use in the table 100 are for convenience of discussion of the present invention and do not imply or require any specific limitations or requirements. The table 100 also includes a clock count indicator starting with clock count "7" for purposes of discussion of the present invention. Note that the rate of the clock count is twice the rate of each of the data streams Highway 2A and Highway 2B.

As illustrated in table 100, bit position "0" for Highway 2A is offset from bit position "8" of Highway 2B by eight clock counts or cycles. Bit position "0" at clock count "8" will be assumed to be the initial bit position for Highway 2A while bit position "8" at clock count "0" will be assumed to be the initial bit position for Highway 2B.

As previously discussed above, the conversion or joining of the two data streams Highway 2A and Highway 2B into a single data stream will be performed by circuitry that includes shift registers. In some embodiments, eight shift register elements may be used. The eight shift register elements are labeled as "SR7", "SR6", "SR5", "SR4", "SR3", "SR2", "SR1" and "SR0" in the table 100 with their specific position in the shift register indicated by their specific element name. Should Highway 2A and Highway 2B not be offset by eight clock counts or cycles, additional shift register elements may be used to align or offset the two data streams by the eight clock counts.

An important aspect of the up rate conversion is that bits are shifted through the shift register elements SR7, SR6, SR5, SR4, SR3, SR2, SR1 and SR0 at each clock cycle, but bits are only loaded into some of the shift register elements on every other cycle. Shift register elements also may be referred to herein as memory or storage positions. For example, as will be discussed in more detail below, after initial loading and shifting of bits from Highway 2A into shift register elements SR7, SR6, SR5 and SR4, different bits are loaded into shift register elements SR7 and SR3 at the same time, shift register elements SR6 and SR2 at the same time and two clock cycles after bits are loaded into shift register elements SR7 and SR3, shift register elements SR5 and SR1 at the same time and two clock cycles after bits are loaded into shift register elements SR6 and SR2, and shift register elements SR4 and SR0 at the same time and two clock cycles after bits are loaded into shift register elements SR5 and SR1.

For purposes of discussion, the "-" in the shift register element or position lines SR7, SR6, SR5, SR4, SR3, SR2, SR1 and SR0 are an indication that the value or output of the shift register element is unchanged. The shift register elements SR7, SR6, SR5, SR4, SR3, SR2, SR1 and SR0 may form part of a single eight bit shift register or may form part of multiple shift registers (e.g., shift register elements SR7, SR6, SR5 and SR4 may form part of a four bit shift register while shift register elements SR3, SR2, SR1 and SR0 may form part of another four bit shift register).

With the clock count or clock cycle numbering provided in the table 100, lothing happens at the first clock count "7". At the first clock count (which also can be referred as on or during the first clock count) "8", bit position 0 of Highway 2A first appears in the Highway 2A data stream. The use of clock count numbers is for convenience of discussion and many different clock count number systems can be used for purposes of the present invention.

At first clock count "9", bit position 0 of Highway 2A is loaded into (also referred to as being loaded to or placed on) shift register element SR7.

At first clock count "A", bit position 0 of Highway 2A is shifted from shift register element SR7 to (also referred to as shifted into or placed on) shift register element SR6. No loading of new bits occurs.

At first clock count "B", bit position 0 of Highway 2A is shifted from shift register element SR6 to shift register element SR5 and bit position 1 of Highway 2A is loaded into shift register element SR6.

At first clock count "C", bit position 0 of Highway 2A is shifted from shift register element SR5 to shift register element SR4 and bit position 1 of Highway 2A is shifted from shift register element SR6 to shift register element SR5. No loading of new bits occurs.

At first clock count "D", bit position 0 of Highway 2A is shifted from shift register element SR4 to shift register element SR3, bit position 1 of Highway 2A is shifted from shift register element SR5 to shift register element SR4 and bit position 2 of Highway 2A is loaded into shift register element SR5.

At first clock count "E", bit position 0 of Highway 2A is shifted from shift register element SR3 to shift register element SR2, bit position 1 of Highway 2A is shifted from shift register element SR4 to shift register element SR3 and bit position 2 of Highway 2A is shifted from shift register element SR5 to shift register element SR4. No loading of new bits occurs.

At first clock count "F", bit position 0 of Highway 2A is shifted from shift register element SR2 to shift register element SR1, bit position 1 of Highway 2A is shiifted from shift register element SR3 to shift register element SR2, bit position 2 of Highway 2A is shifted from shift register element SR4 to shift register element SR3, and bit position 3 of Highway 2A is loaded into shift register element SR4.

At first clock count "0", bit position 0 of Highway 2A is shifted from shift register element SR1 to shift register element SR0, bit position 1 of Highway 2A is shifted from shift register element SR2 to shift register element SR1, bit position 2 of Highway 2A is shifted from shift register element SR3 to shift register element SR2, and bit position 3 of Highway 2A is shifted from shift register element SR4 to shift register element SR3. No loading of new bits occurs. Shift register element SR0 becomes the output of the combination of the two data streams Highway 2A and Highway 2B.

At first clock count "1", bit position 1 of Highway 2A is shifted from shift register element SR1 to shift register element SR0, bit position 2 of Highway 2A is shifted from shift register element SR2 to shift register element SR1, and bit position 3 of Highway 2A is shifted from shift register element SR3 to shift register element SR2. In addition, bit position 4 of Highway 2A is loaded into shift register element SR3 and bit position 8 of Highway 2B is loaded into shift register element SR7.

At first clock count "2", bit position 2 of Highway 2A is shifted from shift register element SR1 to shift register element SR0, bit position 3 of Highway 2A is shifted from shift register element SR2 to shift register element SR1, bit position 4 of Highway 2A is shifted from shift register element SR3 to shift register element SR2, and bit position 8 of Highway 2B is shifted from shift register element SR7 to shift register element SR6. No loading of new bits occurs.

At first clock count "3", bit position 3 of Highway 2A is shifted from shift register element SR1 to shift register element SR0, bit position 4 of Highway 2A is shifted from shift register element SR2 to shift register element SR1, and bit position 8 of Highway 2B is shifted from shift register element SR6 to shift register element SR5. In addition, bit position 5 of Highway 2A is loaded into shift register element SR2 and bit position 9 of Highway 2B is loaded into shift register element SR6.

At second clock count "4", bit position 4 of Highway 2A is shifted from shaft register element SR1 to shift register element SR01, bit position 5 of Highway 2A is shifted from shift register element SR2 to shift register element SR1, bit position 8 of Highway 2B is shifted from shift register element SR5 to shift register element SR4, and bit position 9 of Highway 2B is shifted from shift register element SR6 to shift register element SR5. No loading of new bits occurs.

At second clock count "5", bit position 5 of Highway 2A is shifted from shift register element SR1 to shift register element SR0, bit position 8 of Highway 2B is shifted from shift register element SR4 to shift register element SR3, and bit position 9 of Highway 2B is shifted from shift register element SR6 to shift register element SR5. In addition, bit position 6 of Highway 2A is loaded into shift register element SR1 and bit position A of Highway 2B is loaded into shift register element SR5.

At second clock count "6", bit position 6 of Highway 2A is shifted from shift register element SR1 to shift register element SR0, bit position 8 of Highway 2B is shifted from shift register element SR3 to shift register element SR2, bit position 9 of Highway 2B is shifted from shift register element SR4 to shift register element SR3, and bit position A of Highway 2B is shifted from shift register element SR5 to shift register element SR4. No loading of new bits occurs.

At second clock count "7", bit position 7 of Highway 2A is loaded into shift register element SR0, bit position 8 of Highway 2B is shifted from shift register element SR2 to shift register element SR1, bit position 9 of Highway 2B is shifted from shift register element SR3 to shift register element SR2, and bit position A of Highway 2B is shifted from shift register element SR4 to shift register element SR3. In addition, bit position B of Highway 2B is loaded into shift register element SR4. Note that at this stage the bit position 7 of Highway 2A is loaded directly into the output stage of the shift register (e.g., into shift register element SR0).

At second clock count "8", bit position 8 of Highway 2B is shifted from shift register element SR1 to shift register element SR0, bit position 9 of Highway 2B is shifted from shift register element SR2 to shift register element SR1, bit position A of Highway 2B is shifted from shift register element SR3 to shift register element SR2, and bit position B of Highway 2B is shifted from shift register element SR4 to shift register element SR3. No loading of new bits occurs.

At second clock count "9", bit position 9 of Highway 2B is shifted from shift register element SR1 to shift register element SR0, bit position A of Highway 2B is shifted from shift register element SR2 to shift register element SR1, and bit position B of Highway 2B is shifted from shift register element SR3 to shift register element SR2. In addition, second bit position 0 of Highway 2A is loaded into shift register element SR7 and bit position C of Highway 2B is loaded into shift register element SR3. For bit positions for Highway 2A, the loading and shifting of bit positions continues as previously discussed above.

At second clock count "A", bit position A of Highway 2B is shifted from shift register element SR1 to shift register element SR0, bit position B of Highway 2B is shifted from shift register element SR2 to shift register element SR1, bit position C of Highway 2B is shifted from shift register element SR3 to shift register element SR2, and second bit position 0 of Highway 2A is shifted from shift register element SR7 to shift register element SR6. No loading of new bits occurs.

At second clock count "B", bit position B of Highway 2B is shifted from shift register element SR1 to shift register element SR0, bit position C of Highway 2B is shifted from shift register element SR2 to shift register element SR1, and second bit position 0 of Highway 2A is shifted from shift register element SR6 to shift register element SR5. In addition, second bit position 1 of Highway 2A is loaded into shift register element SR6 and bit position D of Highway 2B is loaded into shift register element SR2.

At second clock count "C", bit position C of Highway 2B is shifted from shift register element SR1 to shift register element SR0, bit position D of Highway 2B is shifted from shift register element SR2 to shift register element SR1, second bit position 0 of Highway 2A is shifted from shift register element SR5 to shift register element SR4, and second bit position 1 of Highway 2A is shifted from shift register element SR6 to shift register element SR5. No loading of new bits occurs.

At second clock count "D", bit position D of Highway 2B is shifted from shift register element SR1 to shift register element SR0, second bit position 0 of Highway 2A is shifted from shift register element SR4 to shift register element SR3, and second bit position 1 of Highway 2A is shifted from shift register element SR5 to shift register element SR4. In addition, second bit position 2 of Highway 2A is loaded into shift register element SR5 and bit position E of Highway 2B is loaded into shift register element SR1.

At second clock count "E", bit position E of Highway 2B is shifted from shift register element SR1 to shift register element SR0, second bit position 0 of Highway 2A is shifted from shift register element SR3 to shift register element SR2, and second bit position 1 of Highway 2A is shifted from shift register element SR4 to shift register element SR3, and second bit position 2 of Highway 2A is shifted from shift register element SR5 to shift register element SR4. No loading of new bits occurs.

At second clock count "F", bit position F of Highway 2B is loaded into shift register element SR0, second bit position 0 of Highway 2A is shifted from shift register element SR2 to shift register element SR1, and second bit position 1 of Highway 2A is shifted from shift register element SR3 to shift register element SR2 second bit position 2 of Highway 2A is shifted from shift register element SR4 to shift register element SR3, and second bit position 3 of Highway 2A is loaded into shift register element SR4. Additional shifting and loading of bit positions for Highway 2A and Highway 2B to form a single data stream continues as previously discussed above.

As illustrated by the output bits present on shift register element SR0, the first eight bit positions of Highway 2A are included in the output data stream which are followed by the first eight bit positions of Highway 2B. The next eight output bits are the second eight bit positions of Highway 2A and are followed by the second eight bit positions of Highway 2B, and so on such that alternating sets of eight bit positions from Highway 2A and Highway 2b form the output data stream present on shift register element SR0.

Now referring to a table 200 illustrated in FIG. 2, an example of conversion of two actual data streams into a single data stream using the process described above is illustrated. As shown in the table 200, Highway 2A comprises the string of digits "00011011110101 . . . " while Highway 2B comprises the string of digits "0110110010 . . . ". Thus, for the first eight bits of Highway 2A, first bit position "0" is a zero, first bit position "1" is a zero, first bit position "2" is a zero, first bit position "3" is a one, first bit position "4" is a one, first bit position "5" is a zero, first bit position "6" is a one, and first bit position "7" is a one. For the first eight bits of Highway 2B, first bit position "8" is a zero, first bit position "9" is a one, first bit position "A" is a one, first bit position "B" is a zero, first bit position "C" is a one, first bit position "D" is a one, first bit position "E" is a zero, and first bit position "F" is a zero.

The output stream for the conversion or combination of the two data streams Highway 2A and Highway 2B is provided on shift register element SR0 and is "0001101101101100110 . . . ", the first eight digits of which are the first eight digits of the data stream Highway 2A (e.g., "00011011"), the second eight digits of which are the first eight digits of the data stream Highway 2B (e.g., "01101100"), the third eight digits of which are the second eight digits of the data stream Highway 2A (e.g., "110101 . . . "), the fourth eight digits of which are the second eight digits of the data stream Highway 2B (e.g., "10 . . . "), etc.

As illustrated in the tables 100 and 200 of FIGS. 1 and 2, respectively, the output data stream on shift register element SR0 has a clock rate that is twice the clock rate of either of the data streams Highway 2A and Highway 2B. If different data rate relationships are desired, the size of the shift registers or the number of shift register elements used may be changed to further increase or decrease the data rate conversion from Highway 2A and Highway 2B to the output data stream.

While the embodiments and examples discussed above for up rate conversion illustrate sets of eight bits from two different data streams Highway 2A and Highway 2B being interwoven to create a single data stream, other embodiments may use the shift and load concepts discussed above to interweave sets of four bits, six bits, ten bits, or other desired amounts from the two data streams Highway 2A and Highway 2B to form a single data stream. For example, sets of six bits alternatingly pulled, taken or used from two data streams may be used to form a single data stream by using six shift register elements instead of eight (e.g., the shift register elements SR7 and SR6 may not be needed) and the shift and load concepts disclosed herein.

As another example of how the shift and load concepts described herein can be used to create a data stream, sets of eight bits from four separate input data streams Highway 1A (HWY1A), Highway 1B (HWYY1B), Highway 1C (HWY1C) and Highway 1D (HWY1D) can be used to form a single output data stream as illustrated in a table 300 of FIG. 3. The output data stream can be taken from shift register element SR0. In the example illustrated in FIG. 3, bits are shifted between shift register elements on every clock count but new bits (up to four at a time) from the input data streams are only loaded into shift register elements on every fourth clock count and at the half bit point. Removing one shift register stage or position (e.g., removing shift register position SR0) will allow loading of bits at the three quarter bit point while adding a shift register stage will allow loading of bits at the quarter bit point. Note that at clock count U, four simultaneous loads occur into four different shift register positions, one for a bit from each of the four input data streams. That is, the bit in bit position "S" of data stream Highway 1D is loaded into shift register element SR22, the bit in bit position "L" of data stream Highway 1C is loaded into shift register element SR16, the bit in bit position "C" of data stream Highway 1B is loaded into shift register element SR10, and the bit in bit position "6" of data stream Highway 1A is loaded info shift register element SR4.

In some embodiments, the number of input data streams may be a factor of two. If the input streams are sampled in the middle of the bit period and the output of a timeslot coincides with the last N bits of the input timeslot, then the number of shift register elements or positions is $[((D-1) \times N) - D/2 + 1]$. As previously mentioned above, adding or deleting shift register elements or positions may allow for sampling of the input data streams at different points of the bit period. In some embodiments, a method for use in taking successive sets of N bits from D input data streams to form a single data stream may include loading a first bit from a first of the D input data streams into a first shift register position on a first clock count; and shifting the first bit from the first of the D input data streams through at least $[((D-1) \times N) - D/2 + 1]$ shift register positions during a set of $[((D-1) \times N) - D/2 + 1]$ ,lock counts starting after the first clock count. In addition, the method may include conducting D simultaneous load operations wherein a bit from each of said D input data streams is loaded into a different shift register position.

As illustrated by the examples provided above, in some embodiments where a number D of two or more input data streams having N bits or bit positions per time slot are converted into a single output data stream having alternating sets of N bits from the D input data streams, a minimum of $[((N-1) \times (D-1)) + 1]$ shift register elements or other storage elements can be used. Such number of shift register elements may allow an input data stream to be sampled on the last clock count of a bit period. Additional shift register elements may be used to allow sampling of the input data stream(s) at different points of the bit period.

A loading of a new bit from the first input data stream into a shift register element is done on a first clock count and then on every D−1 clock count afterwards until N bits are loaded from the first input data stream. The first bit from the first input data stream is loaded into a first shift register position, the second bit from the first input data stream is loaded into a Dth (i.e., 1+(D−1)) shift register position if N>=2, the third bit from the first input data stream is loaded into a 2D−1 (i.e., 1+(D−1)+(D−1)) shift register position if N>=3, the fourth bit from the first input data stream is loading a 3D−2 (i.e., 1+(D−1)+(D−1)+(D−1)) shift register position if N>=4), etc. for the first N bits from the first input data stream. Starting at the N+1 clock count, N bits from the second data stream are loaded into the same shift register positions in the same fashion as the first N bits from the first input data stream. If D=3, then N bits from the third input data stream are loaded into the same shift register positions starting at the 2N+1 clock count in the same fashion as the first N bits from the first input data stream. As shown by these examples, in some embodiments, a method for use in taking successive sets of N bits from D input data streams to form a single data stream may include loading a first bit from a first of the D input data streams into a first shift register position on a first clock count and shifting the first bit front the first of the D input data streams through additional [(D−1)×(N−1)] shift register positions during a set of [(D−1)×(N−1)] clock counts starting after the first clock count. In some embodiments, the [(D−1)×(N−1)] clock counts may be consecutive clock counts. In other embodiments, the [(D−1)×(N−1)] clock counts may have other clock counts interspersed with them to further change the rate conversion between the input data streams and the output data stream. In addition, the method may include loading a second bit from the first of the input data streams into a shift register position D at clock count D+1; and loading a third bit from the first of the input data streams into a shift register position 2D−1 at clock count 2D+1. Furthermore, the method may include loading a first bit from a second (of the input data streams into the first shift register position on a N+1 clock count; and shifting the first bit from the second of the D input data streams through the additional [(D−1)×(N−1)] shift register positions during a set of [(D−1)×(N−1)] clock counts (which may be consecutive or non-consecutive) starting after the N+1 clock count. Likewise, the method may include loading a second bit from the second of the input data streams into the shift register position D at clock count N+D+1; and loading a third bit from the second of the input data streams into the shift register position 2D−1 at a clock count N+2D+1. Other shifting and loading operations may take place as described above. The method also may include conducting D simultaneous load operations wherein a bit from each of the D input data streams is loaded into a different shift register position.

The up rate conversion methods described above may be implemented on many different types of devices and via many different hardware and/or software configurations. For example, in some embodiments, the up rate conversion techniques described above may be implemented in a field programmable gate array, programmable logic device, programmable logic array, or other suitable device or chip.

Now referring to FIG. 4, a representative device 350 that may be used to implement the up rate conversion techniques described above to convert two or more input data streams (e.g., Highway 2A, Highway 2B) on input data lines 352, 354 into a single output data stream on output data line 356. Thus, the device 350 is particularly well suited for implementing the up rate conversion as discussed above in relation to FIGS. 1 and 2. While only two input data streams or input data lines 352, 354 are illustrated in FIG. 4, other embodiments may have more than two input data streams or input data lines such as when, for example, four input data streams are converted into a single data stream as illustrated in FIG. 3 and discussed above.

The device 350 may include a clock 358 for providing clock signals, creating a clock count, etc. for a load register 360 and a shift register 362. In some embodiments, the load register 360 and the shift register 362 may receive identical or simultaneous clock signals from the clock 358 The load register 360 may take or use bits from the input data streams on the input data lines 352, 354 and load them in accordance with the methods described above into the shift register 362. Different bits, or bits from different positions in the input data streams, may be loaded into different shift register elements in the shift register 362. More specifically, the shift register 362 may include shift register elements 364A–364N. While the shift register elements 364A–364N may be consecutive or sequential shift register elements in the shift register 362, the load register 360 may load different bits into different shift register elements on different clock counts as previously discussed above. In addition, the shift register 362 may shift one or different bits on each clock count while the load register loads one or more bits into the shift register 362 only on every other clock count.

Down Rate Conversion

In a down rate conversion in accordance with the present invention, alternating sets of N bits from an input data stream are converted into D output data streams. In some embodiments, D sets of N shift register elements or other storage elements can be used in accordance with the present invention.

Now referring to a table 400 illustrated FIG. 5, a process of converting of a single data stream into two data streams will now be discussed. The single data stream of zeros and ones, referred to herein as Highway 4 (HWY4 in the table 400 in FIG. 5), will be converted to form two different data streams Highway 2A (HWY2A in the table 400 in FIG. 5) and Highway 2B (HWY2B in the table 400 in FIG. 5).

An important aspect of the down rate conversion is that bits are loaded into at least one of the shift register elements SRA7, SRA6, SRA5, SRA4, SRA3, SRA2, SRA1 and SRA0 or at least one of the shift register elements SRB7, SRB6, SRB5, SRB4, SRB3, SRB2, SRB1 and SRB0 on each clock cycle, but bits are only shifted between shift register elements on every other cycle, as will be discussed in more detail below.

The shift register elements SRA7, SRA6, SRA5, SRA4, SRA3, SRA2, SRA1 and SRA0 may form part of a single eight bit shift register or may form part of multiple shift registers (e.g., shift register elements SRA7, SRA6, SRA5 and SRA4 may form part of a four bit shift register while shift register elements SRA3, SRA2, SRA1 and SRA0 may form part of another four bit shift register). Similarly, the shift register elements SRB7, SRB6, SRB5, SRB4, SRB3, SRB2, SRB1 and SRB0 may form part of a single eight bit shift register or may form part of multiple shift registers (e.g., shift register elements SRB7, SRB6, SRB5 and SRB4 may form part of a four bit shift register while shift register elements SRB3, SRB2, SRB1 and SRB0 may form part of another four bit shift register).

With the clock count or clock cycle numbering provided in the table 400, at the first clock count "4", bit position 0 of Highway 4 first appears in the Highway 4 data stream.

At first clock count "5", bit position 0 of Highway 4 is loaded into shift register element SRA4. No shifting between shift register elements occurs At first clock count "6", bit position 0 of Highway 4 is shifted from shift register element SRA4 to shift register element SRA3 and bit position 1 of Highway 4 is loaded into shift register element SRA4.

At first clock count "7", position 2 of Highway 4 is loaded into shift register element SRA5. No shifting between shift register elements occurs.

At first clock count "8", bit position 0 of Highway 4 is shifted from shift register element SRA3 to shift register element SRA2, bit position 1 of Highway 4 is shifted from shift register element SRA4 to shift register element SRA3, bit position 2 of Highway 4 is shifted from shift register element SRA5 to shift register element SRA4, and bit position 3 of Highway 4 is loaded into shift register element SRA5.

At first clock count "9", bit position 4 of Highway 4 is loaded into shift register element SRA6. No shifting between shift register elements occurs.

At first clock count "A", bit position 0 of Highway 4 is shifted from shift register element SRA2 to shift register element SRA1, bit position 1 of Highway 4 is shifted from shift register element SRA3 to shift register element SRA2, bit position 2 of Highway 4 is shifted from shift register element SRA4 to shift register element SRA3, bit position 3 of Highway 4 is shifted from shift register element SRA5 to shift register element SRA4, and bit position 5 of Highway 4 is loaded into shift register element SRA6.

At first clock count "B", bit position 6 of Highway 4 is loaded into shift register element SRA7. No shifting between shift register elements occurs.

At first clock count "C", bit position 0 of Highway 4 is shifted from shift register element SRA1 to shift register element SRA0, bit position 1 of Highway 4 is shifted from shift register element SRA2 to shift register element SRA1, bit position 2 of Highway 4 is shifted from shift register element SRA3 to shift register element SRA2, bit position 3 of Highway 4 is shifted from shift register element SRA4 to shift register element SRA3, bit position 4 of Highway 4 is shifted from shift register element SRA5 to shift register element SRA4, bit position 5 of Highway 4 is shifted from shift register element SRA6 to shift register element SRA5, bit position 6 of Highway 4 is shifted from shift register element SRA7 to shift register element SRA6, and bit position 7 of Highway 4 is loaded into shift register element SRA7. The values or outputs on shift register element SRA0 form the data stream Highway 2A.

At first clock count "D", bit position 8 of Highway 4 is loaded into SRB4. No shifting between shift register elements occurs.

At first clock count "E", bit position 1 of Highway 4 is shifted from shift register element SRA1 to shift register element SRA0, bit position 2 of Highway 4 is shifted from shift register element SRA2 to shift register element SRA1, bit position 3 of Highway 4 is shifted from shift register element SRA3 to shift register element SRA2, bit position 4 of Highway 4 is shifted from shift register element SRA4 to shift register element SRA3, bit position 5 of Highway 4 is shifted from shift register element SRA5 to shift register element SRA4, bit position 6 of Highway 4 is shifted from shift register element SRA6 to shift register element SRA5, bit position 7 of Highway 4 is shifted from shift register element SRA7 to shift register element SRA6, bit position 8 of Highway 4 is shifted from shift register element SRB4 to shift register element SRB3, and bit position 9 of Highway 4 is loaded into shift register element SRB4.

At first clock count "F", bit position A of Highway 4 is loaded into SRB5. No shifting between shift register elements occurs.

At first clock count "0", bit position 2 of Highway 4 is shifted from shift register element SRA1 to shift register element SRA0, bit position 3 of Highway 4 is shifted from shift register element SRA2 to shift register element SRA1, bit position 4 of Highway 4 is shifted from shift register element SRA3 to shift register element SRA2, bit position 5 of Highway 4 is shifted from shift register element SRA4 to shift register element SRA3, bit position 6 of Highway 4 is shifted from shift register element SRA5 to shift register element SRA4, bit position 7 of Highway 4 is shifted from shift register element SRA6 to shift register element SRA5, bit position 8 of Highway 4 is shifted from shift register element SRB3 to shift register element SRB2, bit position 9 of Highway 4 is shifted from shift register element SRB4 to shift register element SRB3, bit position A of Highway 4 is shifted from shift register element SRB5 to shift register element SRB4, and bit position B of Highway 4 is loaded into shift register element SRB5.

At first clock count "1", bit position C of Highway 4 is loaded into SRB6. No shifting between shift register elements occurs.

At first clock count "2", bit position 3 of Highway 4 is shifted from shift register element SRA1 to shift register element SRA0, bit position 4 of Highway 4 is shifted from shift register element SRA2 to shift register element SRA1, bit position 5 of Highway 4 is shifted from shift register element SRA3 to shift register element SRA2, bit position 6 of Highway 4 is shifted from shift register element SRA4 to shift register element SRA3, bit position 7 of Highway 4 is shifted from shift register element SRA5 to shift register element SRA4, bit position 8 of Highway 4 is shifted from shift register element SRB2 to shift register element SRB1, bit position 9 of Highway 4 is shifted from shift register element SRB3 to shift register element SRB2, bit position A of Highway 4 is shifted from shift register element SRB4 to shift register element SRB3, bit position B of Highway 4 is shifted from shift register element SRB5 to shift register element SRB4, bit position C of Highway 4 is shifted from shift register element SRB6 to shift register element SRB5, and bit position D of Highway 4 is loaded into shift register element SRB6.

At first clock count "3", bit position E of Highway 4 is loaded into SRB7. No shifting between shift register elements occurs.

At second clock count "4", bit position 4 of Highway 4 is shifted from shift register element SRA1 to shift register element SRA0, bit position 5 of Highway 4 is shifted from shift register element SRA2 to shift register element SRA1, bit position 6 of Highway 4 is shifted from shift register element SRA3 to shift register element SRA2, bit position 7 of Highway 4 is shifted from shift register element SRA4 to shift register element SRA3, bit position 8 of Highway 4 is shifted from shift register element SRB1 to shift register element SRB0, bit position 9 of Highway 4 is shifted from shift register element SRB2 to shift register element SRB1, bit position A of Highway 4 is shifted from shift register element SRB3 to shift register element SRB2, bit position B of Highway 4 is shifted from shift register element SRB4 to shift register element SRB3, bit position C of Highway 4 is shifted from shift register element SRB5 to shift register element SRB4, bit position D of Highway 4 is shifted from shift register element SRB6 to shift register element SRB5, bit position E of Highway 5 is shifted from shift register element SRB7 to shift register element SRB6, and bit position F of Highway 4 is loaded into shift register element SRB7. The output of value of shift register element SRB0 becomes or form the data stream Highway 2B.

At second clock count "5", second bit position 0 of Highway 4 is loaded into SRA4. No shifting between shift register elements occurs.

At second clock count "6", bit position 5 of Highway 4 is shifted from shift register element SRA1 to shift register element SRA0, bit position 6 of Highway 4 is shifted from shift register element SRA2 to shift register element SRA1, bit position 7 of Highway 4 is shifted from shift register element SRA3 to shift register element SRA2, second bit position 0 of Highway 4 is shifted from shift register element SRA4 to shift register element SRA3, second bit position 1 of Highway 4 is loaded into shift register element SRA4, bit position 9 of Highway 4 is shifted from shift register element SRB1 to shift register element SRB0, bit position A of Highway 4 is shifted from shift register element SRB2 to shift register element SRB1, bit position B of Highway 4 is shifted from shift register element SRB3 to shift register element SRB2, bit position C of Highway 4 is shifted from shift register element SRB4 to shift register element SRB3, bit position D of Highway 4 is shifted from shift register element SRB5 to shift register element SRB4, bit position E of Highway 5 is shifted from shift register element SRB6 to shift register element SRB5, and bit position F of Highway 4 is shifted from shift register element SRB7 to shift register element SRB6.

At second clock count "7", second bit position 2 of Highway 4 is loaded into SRA5. No shifting between shift register elements occurs.

At second clock count "8", bit position 6 of Highway 4 is shifted from shift register element SRA1 to shift register element SITA0, bit position 7 of Highway 4 is shifted from shift register element SRA2 to shift register element SRA1, second bit position 0 of Highway 4 is shifted from shift register element SRA3 to SRA2, second bit position 1 of Highway 4 is shifted from shift register element SRA4 to shift register element SRA3, second bit position 2 of Highway 4 is shifted from shift register element SRA5 to SRA4, second position 3 of Highway 4 is loaded into shift register element SRA5, bit position A of Highway 4 is shifted from shift register element SRB1 to shift register element SRB0, bit position B of Highway 4 is shifted from shift register element SRB2 to shift register element SRB1, bit position C of Highway 4 is shifted from shift register element SRB3 to shift register element SRB2, bit position D of Highway 4 is shifted from shift register element SRB4 to shift register element SRB3, bit position E of Highway 5 is shifted from shift register element SRB5 to shift register element SRB4, and bit position F of Highway 4 is shifted from shift register element SRB6 to shift register element SRB5.

At second clock count "9", second bit position 4 of Highway 4 is loaded into SRA6. No shifting between shift register elements occurs.

At second clock count "A", bit position 7 of Highway 4 is shifted from shift register element SRA1 to shift register element SRA0, second bit position 0 of Highway 4 is shifted from shift register element SRA2 to SRA1, second bit position 1 of Highway 4 is shifted from shift register element SRA3 to shift register element SRA2, second bit position 2 of Highway 4 is shifted from shift register element SRA4 to SRA3, second position 3 of Highway 4 is shifted from shift register element SRA5 to shift register element SRA4, second bit position 4 of Highway 4 is shifted from shift register element SRA6 to shift register element SRA5, second bit position 5 of Highway 4 is loaded into shift register element SRA6, bit position B of Highway 4 is shifted from shift register element SRB1 to shift register element SRB0, bit position C of Highway 4 is shifted from shift register element SRB2 to shift register element SRB1, bit position D of Highway 4 is shifted from shift register element SRB3 to shift register element SRB2, bit position E of Highway 5 is shifted from shift register element SRB4 to shift register element SRB3, and bit position F of Highway 4 is shifted from shift register element SRB5 to shift register element SRB4.

At second clock count "B", second bit position 6 of Highway 4 is loaded into SRA7. No shifting between shift register elements occurs.

At second clock count "C", second bit position 0 of Highway 4 is shifted from shift register element SRA1 to SRA0, second bit position 1 of Highway 4 is shifted from shift register element SRA2 to shift register element SRA1, second bit position 2 of Highway 4 is shifted from shift register element SRA3 to SRA2, second position 3 of Highway 4 is shifted from shift register element SRA4 to shift register element SRA3, second bit position 4 of Highway 4 is shifted from shift register element SRA5 to shift register element SRA4, second bit position 5 of Highway 4 is shifted from shift register element SRA6 to shift register element SRA5, second bit position 6 of Highway 4 is shifted from shift register element SRA7 to shift register element SRA6, second bit position 7 of Highway 4 is loaded into shift register element SRA7, bit position C of Highway 4 is shifted from shift register element SRB1 to shift register element SRB0, bit position D of Highway 4 is shifted from shift register element SRB2 to shift register element SRB1, bit position E of Highway 5 is shifted from shift register element SRB3 to shift register element SRB2, and bit position F of Highway 4 is shifted from shift register element SRB4 to shift register element SRB3.

At second clock count "D", second bit position 8 of Highway 4 is loaded into SRB4. No shifting between shift register elements occurs.

At second clock count "E", second bit position 1 of Highway 4 is shifted from shift register element SRA1 to shift register element SRA0, second bit position 2 of Highway 4 is shifted from shift register element SRA2 to SRA1, second position 3 of Highway 4 is shifted from shift register element SRA3 to shift register element SRA2, second bit position 4 of Highway 4 is shifted from shift register element SRA4 to shift register element SRA3, second bit position 5 of Highway 4 is shifted from shift register element SRA5 to shift register element SRA4, second bit position 6 of Highway 4 is shifted from shift register element SRA6 to shift register element SRA5, second bit position 7 of Highway 4 is shifted from shift register element SRA7 to shift register element SRA6, bit position D of Highway 4 is shifted from shift register element SRB1 to shift register element SRB0, bit position E of Highway 5 is shifted from shift register element SRB2 to shift register element SRB1, bit position F of Highway 4 is shifted from shift register element SRB3 to shift register element SRB2, second bit position 8 of Highway 4 is shifted from shift register element SRB4 to shift register element SRB3, and second bit position 9 of Highway 4 is loaded into shift register element SRB4.

At second clock count "F", second bit position A of Highway 4 is loaded into SRB5. No shifting between shift register elements occurs.

At second clock count "0", second bit position 2 of Highway 4 is shifted from shift register element SRA1 to SRA0, second position 3 of Highway 4 is shifted from shift register element SRA2 to shift register element SRA1, second bit position 4 of Highway 4 is shifted from shift register element SRA3 to shift register element SRA2, second bit position 5 of Highway 4 is shifted from shift register element SRA4 to shift register element SRA3, second bit position 6 of Highway 4 is shifted from shift register element SRA5 to shift register element SRA4, second bit position 7 of Highway 4 is shifted from shift register element SRA6 to shift register element SRA5, bit position E of Highway 5 is shifted from shift register element SRB1 to shift register element SRB0, bit position F of Highway 4 is shifted from shift register element SRB2 to shift register element SRB1, second bit position 8 of Highway 4 is shifted from shift register element SRB3 to shift register element SRB2, second bit position 9 of Highway 4 is shifted from shift register element SRB4 to shift register element SRB3, second bit position A of Highway 4 is shifted from shift register element SRB5 to shift register element SRB4, and second bit position B of Highway 4 is loaded into shift register element SRB5.

At second clock count "1", second bit position C of Highway 4 is loaded into SRB6. No shifting between shift register elements occurs.

At second clock count "2", second position 3 of Highway 4 is shifted from shift register element SRA1 to shift register element SRA0, second bit position 4 of Highway 4 is shifted from shift register element SRA2 to shift register element SRA1, second bit position 5 of Highway 4 is shifted from shift register element SRA3 to shift register element SRA2, second bit position 6 of Highway 4 is shifted from shift register element SRA4 to shift register element SRA3, second bit position 7 of Highway 4 is shifted from shift register element SRA5 to shift register element SRA4, bit position F of Highway 4 is shifted from shift register element SRB1 to shift register element SRB0, second bit position 8 of Highway 4 is shifted from shift register element SRB2 to shift register element SRB1, second bit position 9 of Highway 4 is shifted from shift register element SRB3 to shift register element SRB2, second bit position A of Highway 4 is shifted from shift register element SRB4 to shift register element SRB3, second bit position B of Highway 4 is shifted from shift register element SRB5 to shift register element SRB4, second bit position C of Highway 5 is shifted from shift register element SRB6 to shift register element SRB5, and second bit position D of Highway 4 is loaded into shift register element SRB6. Additional loading and shifting of bit positions for Highway 4 to form to separate data streams Highway 2A and Highway 2B continues as previously discussed above.

As illustrated by the output bits present on shift register element SRA0 in the table 400, the first eight bit positions of Highway 4 are included in the output data stream Highway 2A. The second eight bit positions of Highway 4 are the first eight output bits present on shift register element SRB0. The third eight bit positions of Highway 4 are the second eight bit positions present on shift register element SRA0 while the fourth eight positions of Highway 4 are the second eight bit positions present on shift register element SRB0, and so on such that the data stream Highway 4 is broken down into alternating sets of eight bit positions that form the data stream Highway 2A on shift register element SRA0 and the data stream Highway 2B on the shift register element SRB0.

Now referring to table 500 of FIG. 6, an example of conversion of a single data stream into two data streams using the process described above is illustrated. As shown in table 500, Highway 4 comprises the string of digits "00011011011011001101010110100 . . . " Thus, for the first set of eight bits of the data stream Highway 4, first bit position "0" is a zero, first bit position "1" is a zero, first bit position "2" is a zero, first bit position "3" is a zero, first bit position "4" is a one, first bit position "5" is a one, first bit position "6" is a one, and first bit position "7" is a one. This first eight digits of Highway 4 form the first eight digits of Highway 2A (e.g., "00011011"), as output on the shift register element SRA0. In addition, for the second set of eight bits of the data stream Highway 4, first bit position "8" is a zero, first bit position "9" is a one, first bit position "A" is a one, first bit position "B" is a zero, first bit position "C" is a one, first bit position "D" is a one, first bit position "E" is a zero and first bit position "F" is a zero. This second set of eight digits of Highway 4 form the first eight digits of Highway 2B (e g., "01101100"), as output on the shift register element SRB0.

In some embodiment, if different timing or alignments between the data streams Highway 2A and Highway 2B are desired, or if fewer shift registers are available or allowable, the data stream Highway 2A may be output from shift register element SRA3, SRA2, and/or SRA1 instead of SRA0. Similarly, the data stream Highway 2B may be output from shift register elements SRB3, SRB2 and/or SRB1 instead of SRB0. For example, while eight shift register are illustrated in the table 400 to provide the data stream Highway 2A on shift register element SRA0, only five shift registers are need to provide the data stream Highway 2A if the Highway 2A is taken from the output of shift register element SRA3 instead of shift register element SRA0.

In some embodiment, if different timing or alignments between the data streams Highway 2A and Highway 2B are desired, or if additional shift registers are available or allowable, one or more additional shift registers may be added in serial with shift register element SRA0 and/or shift register element SRB0.

As illustrated in tables 400 and 500 of FIGS. 5 and 6, respectively, the data stream Highway 4 has a clock rate that is twice the clock rate of either of the data streams Highway 2A and Highway 2B. If different data rate relationships are desired, additional shift registers or shift register elements may be added to further change the data rate conversion from Highway 4 to Highway 2A and Highway 2B.

While the embodiments and examples discussed above for down rate conversion illustrate using alternating sets of eight bits from a single data stream Highway 4 to form two different data streams Highway 2A and Highway 2B, other embodiments may use the shift and load concepts discussed above use alternating sets of four bits, six bits, ten bits, or other desired amounts from the data stream Highway 4 to form the two data streams Highway 2A and Highway 2B. For example, an input data stream or highway also can be converted into two output highways having alternating sets of six bits from the input highway by using eight shift register elements, instead of sixteen shift register elements, and the shift and load concepts discussed herein, as illustrated in a table 600 in FIG. 7 where the two output data streams derived from the input data stream Highway 4 (HWY4) are taken from shift register elements SRA0 and SRB0 respectively. Additional shift register elements or stages may be used to adjust or align the two output data streams with each other and/or with the input data stream Highway 4. In the example illustrated in table 600, a new bit from the input data stream Highway 4 is loaded on each clock count clock but bits are shifted between shift register elements on every other clock count.

In a down rate conversion in accordance with the present invention, alternating sets of N bits from an input data stream are converted into D output data streams. In some embodiments, D sets of ((N/2)+1) shift register elements or other storage elements (assuming that N is even) can be used in accordance with the present invention. In other embodiments, additional shift register elements or stages may be used to obtain a desired alignment of input and/or output data streams or to change the rate conversion.

As illustrated by the examples discussed above, in some embodiments a method for use in converting D consecutive sets of N bits from an input data stream into D output data streams may include: starting at a first clock count, loading a bit from a first set of N different bit positions of the input data stream into a first set of N/2 shift register positions during a first set of N clock counts, wherein two bits from the input data stream are loaded into each of the first set of N/2 shift register positions; and starting at an N+1 clock count, loading a bit from a second set of N different bit positions of the input data stream into a second set of N/2 shift register positions during a second set of N clock counts, wherein two bits from the input data stream are loaded into each of the second set of N/2 shift register positions. In addition, in some embodiments, after a bit is loaded into one of the first set of N/2 shift register positions, the bit is shifted towards an output shift register position on every other clock count. Furthermore, starting at a 2N+1 clock count, loading a bit from a third set of N different bit positions of the input data stream into the first set of N/2 shift register positions during a third set of N clock counts, wherein two bits from the input data stream are loaded into each of the first set of N/2 shift register positions; and starting at a 3N+1 clock count, loading a bit from a fourth set of N different bit positions of the input data stream into the second set of N/2 shift register positions during a fourth set of N clock counts, wherein two bits from the input data stream are loaded into each of the second set of N/2 shift register positions. Likewise, starting at a 2N+1 clock count, loading a bit from a third set of N different bit positions of the input data stream into a third set of N/2 shift register positions during a third set of N clock counts, wherein two bits from the input data stream are loaded into each of the third set of N/2 shift register positions.

As illustrated above, in some embodiments, a first bit and a second bit in the first set of N different bit positions of the input data stream may be loaded into a first shift register position in the first set of N/2 shift register positions on different clock counts and the first bit may be shifted out of the first shift register position in the first set of N/2 shift register positions on the clock count when the second bit is loaded into the first shift register position in the first set of N/2 shift register positions. In addition, a third bit and a fourth bit in the first set of N different bit positions of the input data stream may be loaded into a second shift register position in the first set of N/2 shift register positions on different clock counts and the third bit may be shifted from the third shift register position to the first shift register position in the first set of N/2 shift register positions on the clock count when the fourth bit is loaded into the second shift register position in the first set of N/2 shift register positions. Similarly, a first bit and a second bit in the second set of N different bit positions of the input data stream may be loaded into a first shift register position in the second set of N/2 shift register positions on different clock counts and the first bit may be shifted out of the first shift register position in the second set of N/2 shift register positions on the clock count when the second bit is loaded into the first shift register position in the second set of N/2 shift register positions.

In some embodiments, an input data stream or highway also can be converted into more than two output highways. For example, an input data stream or highway can be converted into four output data streams by using four shift registers and the shift and load concepts discussed herein.

The down rate conversion methods described above may be implemented on many different types of devices and via many different hardware and/or software configurations. For example, in some embodiments, the down rate conversion techniques described above may be implemented in a field programmable gate array, programmable logic device, programmable logic array, or other suitable device or chip.

Figure 8:
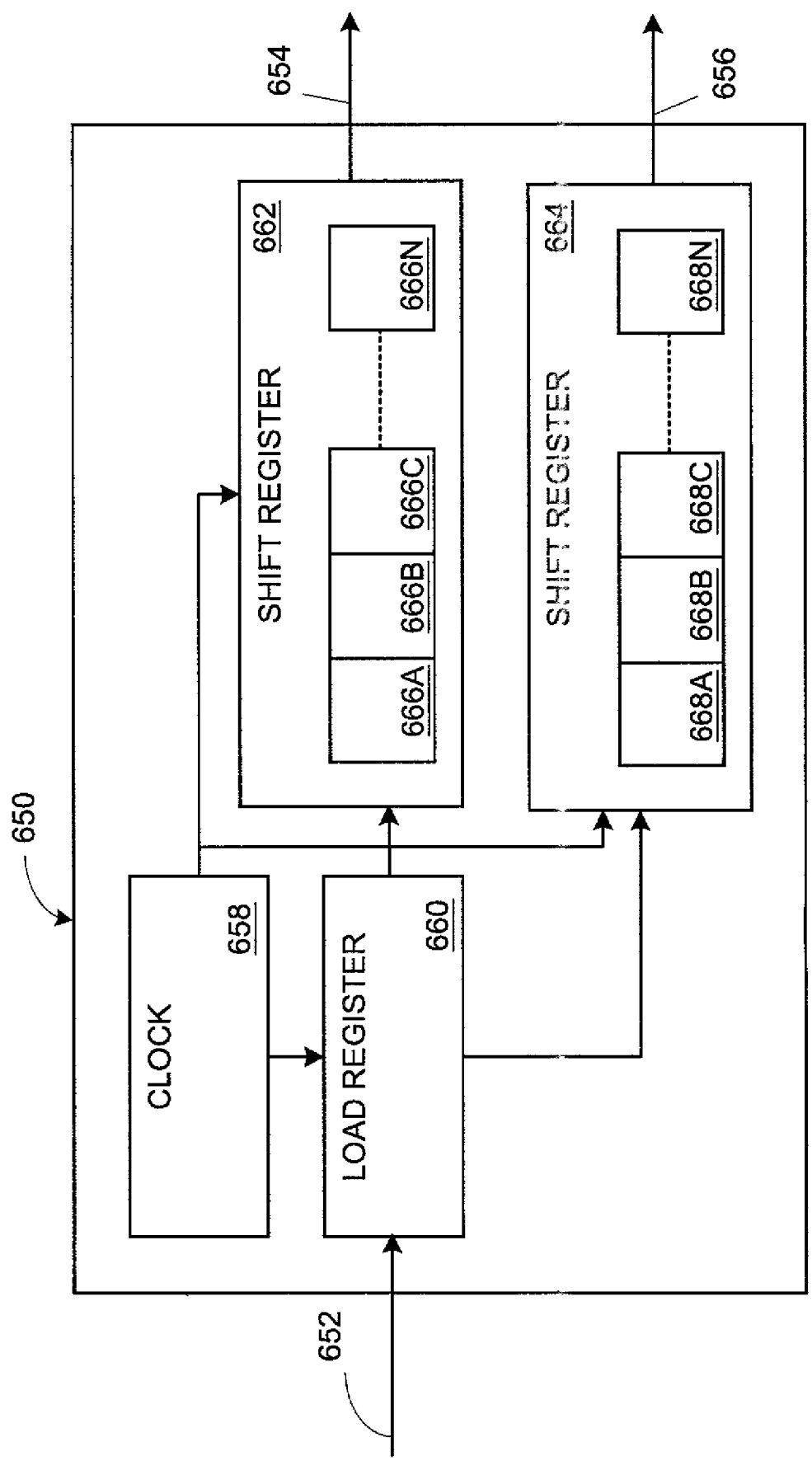
FIG. 8 is an illustration of a representative device that may be used to implement up conversion of a single input data stream into two or more output data streams.

Now referring to FIG. 8, a representative device 650 that may be used to inmplement the down rate conversion techniques described above to convert a single input data stream (e.g., Highway 4) on an input data line 652 into two or more output data streams on output data lines 654, 656. Thus, the device 650 is particularly well suited for implementing the down rate conversion as discussed above in relation to FIGS. 5–7. While only two output data streams or input lines 654, 656 are illustrated in FIG. 8, other embodiments may have more than two output data streams or output data lines such as when, for example, a single input data stream is converted into a four output data streams.

The device 650 may include a clock 658 for providing clock signals, creating a clock count, etc. for a load register 660 and shift registers 662, 664. In some embodiments, the load register 660 and the shift registers 662, 664 may receive identical or simultaneous clock signals from the clock 658. The load register 660 may take or use bits from the input data stream on the input data line 652 and load them in accordance with the methods described above into the shift registers 662, 664. Different bits, or bits from different positions in the input data stream, may be loaded into different shift registers or different shift register elements in the shift registers 662, 664. More specifically, the shift register 662 may include shift register elements 666A–666N. Similarly, the shift register 664 may include shift register elements 668A–668N. While the shift register elements 666A–666N may be consecutive or sequential shift register elements in the shift register 662, and the shift register elements 668A–668N may be consecutive or sequential shift register elements in the shift register 664, the load register 660 may load different bits into different shift register elements and/or different shift registers on different clock counts as previously discussed above. In addition, the load register 660 may load one or more bits into the shift register 662 and/or the shift register 664 on each clock count while one or both of the shift registers 662, 664 shift one or more bits only on every other clock count.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. For example, the conversion techniques described above can be implemented in a field programmable gate array, programmable logic device, programmable logic array, or other suitable device or chip, such as an Actel A42MX16™ field programmable gate array or a Xilinx XC95144XL complex programmable logic device (CPLD).

In some embodiments of the up rate conversion and/or down rate conversion methods disclosed herein, the methods may include receiving, detecting, or retrieving a data stream and/or sending, storing, or transmitting a data stream.

The conversion methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The invention claimed is:

1. A method for use in converting multiple data streams into a single data stream, comprising:
   on a first clock count, loading a first bit of a first data stream directly from said first data stream into a first storage position;
   on a second clock count, shifting said first bit of said first data stream from said first storage position into a second storage position;
   on a third clock count, shifting said first bit of said first data stream from said second storage position into a third storage position and loading a second bit of said first data stream directly from said first data stream into said second storage position; and
   on a fourth clock count, shifting said first bit of said first data stream from said third second storage position into a fourth storage position and shifting said second bit of said first data stream from said second storage position into said third storage position.

2. The method of claim 1, further comprising:
   on a fifth clock count, shifting said first bit of said first data stream from said fourth storage position into a fifth storage position, shifting said second bit of said first data stream from said third storage position into said fourth storage position, and loading a third bit of said first data stream directly from said first data stream into said third storage position; and
   on a sixth clock count, shifting said first bit of said first data stream from said fifth storage position into a sixth storage position, shifting said second bit of said first data stream from said fourth storage position into said fifth storage position, and shifting said third bit of said first data stream from said third storage position into said fourth storage position.

3. The method of claim 2, further comprising:
   on a seventh clock count, shifting said first bit of said first data stream from said sixth storage position into a seventh storage position, shifting said second bit of said first data stream from said fifth storage position into said sixth storage position, shifting said third bit of said first data stream from said fourth storage position into said fifth storage position, and loading a fourth bit of said first data stream directly from said first data stream into said fourth storage position; and
   on an eighth clock count, shifting said first bit of said first data stream from said seventh storage position into an eighth storage position, shifting said second bit of said first data stream from said sixth storage position into said seventh storage position, shifting said third bit of said first data stream from said fifth storage position into said sixth storage position; and shifting said fourth bit of said first data stream from said fourth storage position into said fifth storage position.

4. The method of claim 3, further comprising:
   on a ninth clock count, shifting said second bit of said first data stream from said seventh fifth storage position into said eighth storage position, shifting said third bit of said first data stream from said sixth storage position into said seventh storage position, shifting said fourth bit of said first data stream from said fifth storage position into said sixth storage position, loading a fifth bit of said first data stream directly from said first data stream into said fifth storage position, and loading a first bit of a second data stream directly from said second data stream into said first storage position;
   on a tenth clock count, shifting said third bit of said first data stream from said seventh storage position into said eighth storage position, shifting said fourth bit of said first data stream from said sixth storage position into said seventh storage position, shifting said fifth bit of said first data stream from said fifth storage position into said sixth storage position, and shifting said first bit of said second data stream from said first storage position into said second storage position;
   on an eleventh clock count, shifting said fourth bit of said first data stream from said seventh storage position into said eighth storage position, shifting said fifth bit of said first data stream from said sixth storage position into said seventh storage position, loading a sixth bit of said first data stream directly from said first data stream into said sixth storage position, shifting said first bit of said second data stream from said second storage position into said third storage position, and loading a second bit of said second data stream directly from said second data stream into said second storage position; and
   on a twelfth clock count, shifting said fifth bit of said first data stream from said seventh storage position into said eighth storage position, shifting said sixth bit of said first data stream from said sixth storage position into said seventh storage position, shifting said first bit of said second data stream from said third storage position into said fourth storage position, and shifting said second bit of said second data stream from said second storage position into said third storage position.

5. The method of claim 4, further comprising:
   on a thirteenth clock count, shifting said sixth bit of said first data stream from said seventh storage position into said eighth storage position, loading a seventh bit of said first data stream directly from said first data stream into said seventh storage position, shifting said first bit of said second data stream from said fourth storage position into said fifth storage position, shifting said second bit of said second data stream from said third storage position into said fourth storage position, and loading a third bit of said second data stream directly from said second data stream into said third storage position;
   on a fourteenth clock count, shifting said seventh bit of said first data stream from said seventh storage position into said eighth storage position, shifting said first bit of said second data stream from said fifth storage position into said sixth storage position, shifting said second bit of said second data stream from said fourth storage position into said fifth storage position, and shifting said third bit of said second data stream from said third storage position into said fourth storage position;
   on a fifteenth clock count, loading a eighth bit of said first data stream directly from said first data stream into said eighth storage position, shifting said first bit of said second data stream from said sixth storage position into said seventh storage position, shifting said second bit of said second data stream from said fifth storage position into said sixth storage position, shifting said third bit of said second data stream from said fourth storage position into said fifth storage position, and loading a fourth bit of said second data stream directly from said second data stream into said fourth storage position;

on a sixteenth clock count, shifting said first bit of said second data stream from said seventh storage position into said eighth storage position, shifting said second bit of said second data stream from said sixth storage position into said seventh storage position, shifting said third bit of said second data stream from said fifth storage position into said sixth storage position, and shifting said fourth bit of said second data stream from said fourth storage position into said fifth storage position;

on a seventeenth clock count, loading a ninth bit of said first data stream directly from said first data stream into said first storage position, shifting said second bit of said second data stream from said seventh storage position into said eighth storage position, shifting said third bit of said second data stream from said sixth storage position into said seventh storage position, shifting said fourth bit of said second data stream from said fifth storage position into said sixth storage position, and loading a fifth bit of said second data stream directly from said second data stream into said fifth storage position;

on a eighteenth clock count, shifting said ninth bit of said first data stream from said first storage position into said second storage position, shifting said third bit of said second data stream from said seventh storage position into said eighth storage position, shifting said fourth bit of said second data stream from said sixth storage position into said seventh storage position, and shifting said fifth bit of said second data stream from said fifth storage position into said sixth storage position;

on a nineteenth clock count, shifting said ninth bit of said first data stream from said second storage position into said third storage position, loading a tenth bit of said first data stream directly from said first data stream into said second storage position, shifting said fourth bit of said second data stream from said seventh storage position into said eighth storage position, shifting said fifth bit of said second data stream from said sixth storage position into said seventh storage position, and loading a sixth bit of said second data stream directly from said second data stream into said sixth storage position;

on a twentieth clock count, shifting said ninth bit of said first data stream from said third second storage position into said fourth storage position, shifting said tenth bit of said first data stream from said second storage position into said third storage position, shifting said fifth bit of said second data stream from said seventh storage position into said eighth storage position, and shifting said sixth bit of said second data stream from said sixth storage position into said seventh storage position;

on a twenty-first clock count, shifting said ninth bit of said first data stream from said fourth storage position into said fifth storage position, shifting said tenth bit of said first data stream from said third storage position into said fourth storage position, loading an eleventh bit of said first data stream directly from said first data stream into said third storage position, shifting said sixth bit of said second data stream from said seventh storage position into said eighth storage position, and loading a seventh bit of said second data stream directly from said second data stream into said seventh storage position;

on a twenty-second clock count, shifting said ninth bit of said first data stream from said fifth storage position into said sixth storage position, shifting said tenth bit of said first data stream from said fourth storage position into said fifth storage position, shifting said eleventh bit of said first data stream from third second storage position into said fourth storage position, and shifting said seventh bit of said second data stream from said seventh storage position into said eighth storage position; and on a twenty-third clock count, shifting said ninth bit of said first data stream from said sixth storage position into said seventh storage position, shifting said tenth bit of said first data stream from said fifth storage position into said sixth storage position, shifting said eleventh bit of said first data stream from said fourth storage position into said fifth storage position, loading an twelfth bit of said first data stream directly from said first data stream into said fourth storage position, and loading an eighth bit of said second data stream directly from said second data stream into said eighth storage position.

6. A method for use in taking sets of N bits from D input data streams to form a single data stream, comprising:
loading a first bit from a first of the D input data streams into a first storage position on a first clock count;
shifting said first bit from said first of the D input data streams through at least [(D−1)×(N−1)] storage positions during a set of [(D=1)×(N−1)] clock counts starting after said first clock count;
loading a second bit from said first of said input data streams into a storage position D at clock count D+1; and
loading a third bit from said first of said input data streams into a storage position 2D−1 at clock count 2D1.

7. A method for use in taking sets of N bits from D input data streams to form a single data stream, comprising:
loading a first bit from a first of the D input data streams into a first storage position on a first clock count;
shifting said first bit from said first of the D input data streams through at least [(D−1)×(N−1)] storage positions during a set of [(D−1)×(N−1)] clock counts starting after said first clock count;
loading a first bit from a second of said input data streams into said first storage position on a N+1 clock count;
shifting said first bit from said second of the D input data streams through said additional [(D−1)×(N−1)] storage positions during a set of [(D−1)×(N−1)] clock counts starting after said N+1 clock count;
loading a second bit from said second of said input data streams into said storage position D at clock count N+D+1; and
loading a third bit from said second of said input data streams into said storage position 2D−1 at clock count N+2D+1.

8. The method of claim 6, further comprising:
conducting D simultaneous load operations wherein during each of said load operations a bit from each of said D input data streams is loaded into a different storage position.

9. A method for use in converting D sets of N bits from an input data stream into D output data streams, comprising:
starting at a first clock count, loading a bit from a first set of N different bit positions of said input data stream into a first set of N/2 storage positions during a first set of N clock counts, wherein a total of two bits from said input data stream are loaded into each of said first set of N/2 storage positions; and starting at an N+1 clock count, loading a bit from a second set of N different bit positions of said input data stream into a second set of N/2 storage positions during a second set of N clock counts, wherein a total of two bits from said input data stream are loaded into each of said second set of N/2 storage positions; and wherein N>=2 and N is even.

10. The method of claim 9, wherein after a bit is loaded into one of said first set of N/2 storage positions, said bit is shifted towards an output storage position on every other clock count.

11. The method of claim 9, further comprising:

starting at a 2N+1 clock count, loading a bit from a third set of N different bit positions of said input data stream into said first set of N/2 storage positions during a third set of N clock counts, wherein a total of two bits from said input data stream are loaded into each of said first set of N/2 storage positions; and starting at a 3N+1 clock count, loading a bit from a fourth set of N different bit positions of said input data stream into said second set of N/2 storage positions during a fourth set of N clock counts, wherein a total of two bits from said input data stream are loaded into each of said second set of N/2 storage positions.

12. The method of claim 9, further comprising:

starting at a 2N+1 clock count, loading a bit from a third set of N different bit positions of said input data stream into a third set of N/2 storage positions during a third set of N clock counts, wherein a total of two bits from said input data stream are loaded into each of said third set of N/2 storage positions.

13. The method of claim 9, wherein a first bit and a second bit in said first set of N different bit positions of said input data stream are loaded into a first storage position in said first set of N/2 storage positions on different clock counts and wherein said first bit is shifted out of said first storage position in said first set of N/2 storage positions on the clock count when said second bit is loaded into said first storage position in said first set of N/2 storage positions.

14. The method of claim 13, wherein a third bit and a fourth bit in said first set of N different bit positions of said input data stream are loaded into a second storage position in said first set of N/2 storage positions on different clock counts and wherein said third bit is shifted from said third storage position to said first storage position in said first set of N/2 storage positions on the clock count when said fourth bit is loaded into said second storage position in said first set of N/2 storage positions.

15. The method of claim 13, wherein a first bit and a second bit in said second set of N different bit positions of said input data stream are loaded into a first storage position in said second set of N/2 storage positions on different clock counts and wherein said first bit is shifted out of said first storage position in said second set of N/2 storage positions on the clock count when said second bit is loaded into said first storage position in said second set of N/2 storage positions.

16. A method for use in converting a data stream into multiple data streams, comprising:

on a first clock count, loading a first bit from a data stream into a first storage position;

on a second clock count, shifting said first bit into a second storage position and loading a second bit from said data stream into said first storage position; and on a third clock count, loading a third bit from said data stream into a third storage position.

17. The method of claim 16, further comprising:

on a fourth clock count, shifting said first bit into a fourth storage position, shifting said second bit into said second storage position, shifting said third bit into said first storage position, and loading a fourth bit from said data stream into said third storage position.

18. The method of claim 16, further comprising:

on a fourth clock count, shifting said second bit into said second storage position, shifting said third bit into said first storage position, and loading a fourth bit from said data stream into said third storage position.

19. The method of claim 17, further comprising:

on a fifth clock count, loading a fifth bit from said data stream into a fifth storage position; and on a sixth clock count, shifting said first bit into a sixth storage position, shifting said second bit into said fourth storage position, shifting said third bit into said second storage position, shifting said fourth bit into said first storage position, shifting said fifth bit into said third storage position, and loading a sixth bit from said data stream into said fifth storage position.

20. The method of claim 19, further comprising:

on a seventh clock count, loading a seventh bit from said data stream into a seventh storage position; and on an eighth clock count, shifting said first bit into an eighth storage position, shifting said second bit into said sixth storage position, shifting said third bit into said fourth storage position, shifting said fourth bit into said second storage position, shifting said fifth bit into said fifth storage position, shifting said sixth bit into said third storage position, shifting said seventh bit into said fifth storage position, and loading an eighth bit from said data stream into said seventh storage position.

21. The method of claim 20, further comprising:

on a ninth clock count, loading a ninth bit from said data stream into a ninth storage position;

on a tenth clock count, shifting said second bit into said eighth storage position, shifting said third bit into said sixth storage position, shifting said fourth bit into said fourth storage position, shifting said fifth bit into said second storage position, shifting said sixth bit into said first storage position, shifting said seventh bit into said third storage position, shifting said eighth bit into said fifth storage position, shifting said ninth bit into a tenth storage position, and loading a tenth bit from said data stream into said ninth storage position.

on an eleventh clock count, loading an eleventh bit from said data stream into an eleventh storage position;

on a twelfth clock count, shifting said third bit into said eighth storage position, shifting said fourth bit into said sixth storage position, shifting said fifth bit into said fourth storage position, shifting said sixth bit into said second storage position, shifting said seventh bit into said first storage position, shifting said eighth bit into said third storage position, shifting said ninth bit into a twelfth storage position, shifting said tenth bit into said tenth storage position, shifting said eleventh bit into said ninth storage position, and loading a twelfth bit from said data stream into said eleventh storage position;

on a thirteenth clock count, loading a thirteenth bit from said data stream into an thirteenth storage position;

on a fourteenth clock count, shifting said fourth bit into said eighth storage position, shifting said fifth bit into said sixth storage position, shifting said sixth bit into said fourth storage position, shifting said seventh bit into said second storage position, shifting said eighth bit into said first storage position, shifting said ninth bit into a fourteenth storage position, shifting said tenth bit into said twelfth storage position, shifting said eleventh bit into said tenth storage position, shifting said twelfth bit into said ninth storage position, shifting said thirteenth bit into said eleventh storage position, and loading a fourteenth bit from said data stream into said thirteenth storage position;

on a fifteenth clock count, loading a fifteenth bit from said data stream into an fifteenth storage position;

on an sixteenth clock count, shifting said fifth bit into said eighth storage position, shifting said sixth bit into said sixth storage position, shifting said seventh bit into said fourth storage position, shifting said eighth bit into said second storage position, shifting said ninth bit into a sixteenth storage position, shifting said tenth bit into said fourteenth storage position, shifting said eleventh bit into said twelfth storage position, shifting said twelfth bit into said tenth storage position, shifting said thirteenth bit into said ninth storage position, shifting said fourteenth bit into said eleventh storage position, shifting said fifteenth bit into said thirteenth storage position, and loading a sixteenth bit from said data stream into said fifteenth storage position;

on a seventeenth clock count, loading a seventeenth bit from said data stream into said first storage position;

on an eighteenth clock count, shifting said sixth bit into said eighth storage position, shifting said seventh bit into said sixth storage position, shifting said eighth bit into said fourth storage position, shifting said tenth bit into said sixteenth storage position, shifting said eleventh bit into said fourteenth storage position, shifting said twelfth bit into said twelfth storage position, shifting said thirteenth bit into said tenth storage position, shifting said fourteenth bit into said ninth storage position, shifting said fifteenth bit into said eleventh storage position, shifting said sixteenth bit into said thirteenth storage position, shifting said seventeenth bit into said second storage position, and loading an eighteenth bit from said data stream into said first storage position;

on a nineteenth clock count, loading a nineteenth bit from said data stream into said third storage position;

on a twentieth clock count, shifting said seventh bit into said eighth storage position, shifting said eighth bit into said sixth storage position, shifting said eleventh bit into said sixteenth storage position, shifting said twelfth bit into said fourteenth storage position, shifting said thirteenth bit into said twelfth storage position, shifting said fourteenth bit into said tenth storage position, shifting said fifteenth bit into said ninth storage position, shifting said sixteenth bit into said eleventh storage position, shifting said seventeenth bit into said fourth storage position, shifting said eighteenth bit into said second storage position, shifting said nineteenth bit into said first storage position, and loading a twentieth bit from said data stream into said third storage position;

on a twenty-first clock count, loading a twenty-first bit from said data stream into said fifth storage position;

on an twenty-second clock count, shifting said eighth bit into said eighth storage position, shifting said twelfth bit into said sixteenth storage position, shifting said thirteenth bit into said fourteenth storage position, shifting said fourteenth bit into said twelfth storage position, shifting said fifteenth bit into said tenth storage position, shifting said sixteenth bit into said ninth storage position, shifting said seventeenth bit into said sixth storage position, shifting said eighteenth bit into said fourth storage position, shifting said nineteenth bit into said second storage position, shifting said twentieth bit into said first storage position, shifting said twenty-first bit into said third storage position, and loading a twenty-second bit from said data stream into said fifth storage position;

on a twenty-third clock count, loading a twenty-third bit from said data stream into said seventh storage position;

on a twenty-fourth clock count, shifting said thirteenth bit into said sixteenth storage position, shifting said fourteenth bit into said fourteenth storage position, shifting said fifteenth bit into said twelfth storage position, shifting said sixteenth bit into said tenth storage position, shifting said seventeenth bit into said eighth storage position, shifting said eighteenth bit into said sixth storage position, shifting said nineteenth bit into said fourth storage position, shifting said twentieth bit into said second storage position, shifting said twenty-first bit into said first storage position, shifting said twenty-second bit into said third storage position, shifting said twenty-third bit into said fifth storage position, and loading a twenty-fourth bit from said data stream into said seventh storage position;

on a twenty-fifth clock count, loading a twenty-fifth bit from said data stream into said ninth storage position;

on an twenty-sixth clock count, shifting said fourteenth bit into said sixteenth storage position, shifting said fifteenth bit into said fourteenth storage position, shifting said sixteenth bit into said twelfth storage position, shifting said eighteenth bit into said eighth storage position, shifting said nineteenth bit into said sixth storage position, shifting said twentieth bit into said fourth storage position, shifting said twenty-first bit into said second storage position, shifting said twenty-second bit into said first storage position, shifting said twenty-third bit into said third storage position, shifting said twenty-fourth bit into said fifth storage position, shifting said twenty-fifth bit into said tenth storage position, and loading a twenty-sixth bit from said data stream into said ninth storage position;

on a twenty-seventh clock count, loading a twenty-seventh bit from said data stream into said eleventh storage position;

on a twenty-eighth clock count, shifting said fifteenth bit into said sixteenth storage position, shifting said sixteenth bit into said fourteenth storage position, shifting said nineteenth bit into said eighth storage position, shifting said twentieth bit into said sixth storage position, shifting said twenty-first bit into said fourth storage position, shifting said twenty-second bit into said second storage position, shifting said twenty-third bit into said first storage position, shifting said twenty-fourth bit into said third storage position, shifting said twenty-fifth bit into said twelfth storage position, shifting said twenty-sixth bit into said tenth storage position, shifting said twenty-seventh bit into said ninth storage position, and loading a twenty-eighth from said data stream into said eleventh storage position;

on a twenty-ninth clock count, loading a twenty-ninth bit from said data stream into said thirteenth storage position; and on a thirtieth clock count, shifting said sixteenth bit into said sixteenth storage position, shifting said twentieth bit into said eighth storage position, shifting said twenty-first bit into said sixth storage position, shifting said twenty-second bit into said fourth storage position, shifting said twenty-third bit into said second storage position, shifting said twenty-fourth bit into said first storage position, shifting said twenty-fifth bit into said fourteenth storage position, shifting said twenty-sixth bit into said twelfth storage position, shifting said twenty-seventh bit into said tenth storage position, shifting said twenty-eighth bit into said ninth storage position, shifting said twenty-ninth bit into said eleventh storage position, and loading a thirtieth bit from said data stream into said thirteenth storage position.

22. An apparatus capable of performing a method for use in converting D sets of N bits from an input data stream into D output data streams, comprising:

means for, starting at a first clock count, using a bit from a first set of N different bit positions of said input data stream to fill a first set of N/2 storage positions during a first set of N clock counts, wherein two bits from said input data stream are used to fill each of said first set of N/2 storage positions; and means for, starting at an N+1 clock count, using a bit from a second set of N different bit positions of said input data stream to fill a second set of N/2 storage positions during a second set of N clock counts, wherein two bits from said input data stream are used to fill each of said second set of N/2 storage positions.

23. A computer program product in a computer readable medium for use in converting D sets of N bits from an input data stream into D output data streams, comprising:

first instructions for, starting at a first clock count, using a bit from a first set of N different bit positions of said input data stream to fill a first set of N/2 storage positions during a first set of N clock counts, wherein two bits from said input data stream are used to fill each of said first set of N/2 storage positions; and second instructions for, starting at an N+1 clock count, using a bit from a second set of N different bit positions of said input data stream to fill a second set of N/2 storage positions during a second set of N clock counts, wherein two bits from said input data stream are used to fill each of said second set of N/2 storage positions.

24. An apparatus for use in converting D sets of N bits from an input data stream into D output data streams, comprising:

a clock;

a load register connected to said clock; and a D number of shift registers connected to said clock and to said load register, wherein each of said D number of shift registers includes a plurality of shift register elements;

wherein said clock, said load register and said D number of shift registers are operative to:

starting at a first clock count, load a bit from a first set of N different bit positions of said input data stream into a first set of N/2 shift register elements during a first set of N clock counts, wherein two bits from said input data stream are loaded into each of said first set of N/2 shift register elements; and starting at an N+1 clock count, load a bit from a second set of N different bit positions of said input data stream into a second set of N/2 shift register elements during a second set of N clock counts, wherein two bits from said input data stream are loaded into each of said second set of N/2 shift register elements.

* * * * *